(12) United States Patent
Shikii et al.

(10) Patent No.: US 8,456,588 B2
(45) Date of Patent: Jun. 4, 2013

(54) LIQUID CRYSTAL DISPLAY BACKLIGHT AND LIQUID CRYSTAL DISPLAY DEVICE USING SAME

(75) Inventors: Shinichi Shikii, Nara (JP); Shinichi Kadowaki, Hyogo (JP); Tatsuo Itoh, Osaka (JP); Takayuki Nagata, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 651 days.

(21) Appl. No.: 12/671,570

(22) PCT Filed: May 29, 2009

(86) PCT No.: PCT/JP2009/002386
§ 371 (c)(1),
(2), (4) Date: Feb. 1, 2010

(87) PCT Pub. No.: WO2009/147808
PCT Pub. Date: Dec. 10, 2009

(65) Prior Publication Data
US 2011/0228195 A1    Sep. 22, 2011

(30) Foreign Application Priority Data
Jun. 3, 2008   (JP) .................................. 2008-145304

(51) Int. Cl.
*G02F 1/1335* (2006.01)
(52) U.S. Cl.
USPC ............................................. 349/62; 349/63
(58) Field of Classification Search
USPC .................................................... 349/62, 63
See application file for complete search history.

(56) References Cited

U.S. PATENT DOCUMENTS
6,575,584 B1 * 6/2003 Habraken ..................... 362/609
(Continued)

FOREIGN PATENT DOCUMENTS
JP    53-142247    12/1978
JP    61-270772    12/1986
(Continued)

OTHER PUBLICATIONS

International Search Report issued Sep. 8, 2009 in International (PCT) Application No. PCT/JP2009/002386.

*Primary Examiner* — Lucy Chien
(74) *Attorney, Agent, or Firm* — Wenderoth, Lind & Ponack, L.L.P.

(57) ABSTRACT

An LCD backlight has a light source that emits a laser light, a lens, a mirror, a rotary polygon mirror, a scanning lens and a return mirror constituting a transforming optical system that transforms the laser light from the light source to a linear light. A light guiding plate allows the linear light to enter and emits two-dimensional light in the horizontal direction. An emission end face of the light source is disposed in a rear face side of the light guiding plate so that a surface normal line thereof is in the horizontal direction or is inclined downward from the horizontal direction. The lens, mirror and scanning lens are disposed in the rear face side of the light guiding plate, so that surface normal lines of the light transmission surface and light reflection surface thereof are all in the horizontal direction or are inclined downward from the horizontal direction.

19 Claims, 16 Drawing Sheets

U.S. PATENT DOCUMENTS

| | | |
|---|---|---|
| 2002/0159036 A1 | 10/2002 | Yamagishi et al. |
| 2003/0156233 A1* | 8/2003 | Ohsumi .................... 349/65 |
| 2003/0156310 A1 | 8/2003 | Suzuki et al. |
| 2003/0160911 A1* | 8/2003 | Kano ........................ 349/65 |
| 2004/0042233 A1* | 3/2004 | Suzuki et al. ............. 362/561 |
| 2005/0128374 A1* | 6/2005 | Furukawa ................. 349/56 |
| 2006/0072339 A1 | 4/2006 | Li et al. |
| 2006/0209166 A1 | 9/2006 | Suzuki et al. |
| 2009/0207342 A1 | 8/2009 | Yamaguchi et al. |
| 2010/0231491 A1 | 9/2010 | Mizuuchi et al. |

FOREIGN PATENT DOCUMENTS

| | | |
|---|---|---|
| JP | 2001-350112 | 12/2001 |
| JP | 2002-337386 | 11/2002 |
| JP | 2003-215484 | 7/2003 |
| JP | 2004-146269 | 5/2004 |
| JP | 2006-108076 | 4/2006 |
| JP | 2006-331683 | 12/2006 |
| WO | 2007/015402 | 2/2007 |
| WO | 2007/094304 | 8/2007 |
| WO | 2007/135960 | 11/2007 |

* cited by examiner

LIQUID CRYSTAL DISPLAY BACKLIGHT AND LIQUID CRYSTAL DISPLAY DEVICE USING SAME

BACKGROUND OF THE INVENTION

1. Technical Field

The present invention relates to a thin and high brightness LCD (liquid crystal display) backlight used for a non-self emission type display device such as a liquid crystal TV, and a liquid crystal display device using this LCD backlight.

2. Background Art

A liquid crystal display uses a system of displaying images by controlling the transmission quantity of light that is irradiated from the rear face using the electro-optical effect based on liquid crystal molecule orientation, and generally requires a flat illumination device called a "backlight unit" that is constituted by fluorescent display tubes. Recently the screen size of liquid crystal devices is increasing, and now even a 50 inch size or larger TV display device is commercialized. At the same time power consumption is increasing as well as screen size increases, therefore technical developments to implement lower power consumption is demanded, and in order to minimize the space to be occupied in a room where the display device is installed as well, thin construction is strongly demanded. At the same time, an increase in brightness and resolution is demanded.

In order to support lower power consumption and higher brightness, of these demands, the use of light emitting diodes (hereafter LED(s)) and lasers are being considered as light sources having good emission efficiency, and an LCD backlight using an LED as a light source has already been commercialized. However if a laser light source is used to support further lower power consumption, high brightness and a wider color gamut, it is critical to improve dust resistance of the LCD backlight that irradiates the liquid crystal panel from the rear face. Because laser light, which has linear propagation characteristics, can be condensed to a small spot, and this becomes a factor of differentiation when the device is downsized, if micro-dust deposits on the surface of the optical component, then an image quality problem occurs to the image display device, such as a drop in transmittance of the laser light and uneven brightness.

Possible solutions to solve this problem are assembling the optical components of the liquid crystal display device in a clean room where minimal dust exists, or physically sealing the optical system of the liquid crystal display device so that no dust enters from the outside. However these solution are impractical when the necessity of an efficient cooling system for suppressing a temperature rise of the LCD backlight, including the optical system, and the manufacturing cost of the liquid crystal display device are considered.

In an optical system that deflects the laser light to detect signals or to record signals, such as an image recording device, printer and facsimile, it has been proposed to prevent the adhesion of dust to a mirror of which incident angle of a laser light changes due to the deflection of the laser light by installing the mirror such that the surface normal line thereof becomes lower from the horizontal line (e.g. See Patent Document 1). According to this proposal, the adhesion of not only dust but also toner to the mirror can be prevented, and a drop in reflectance and reflection unevenness can be suppressed.

In a multi-color image output device, it has been disclosed that a mirror face of a reflection mirror for guiding light to each exposure unit can be disposed downward by disposing the exposure unit in the upper circumference of a photosensitive body, so as to prevent the adhesion of dust to the mirror face by self weight (e.g. see Patent Document 2). According to this proposal, the reflected light or laser light is not affected and image quality deterioration due to dust on the mirror face does not occur.

In a digital xerography type image formation device, such as a laser printer, it has been disclosed that a drop in light quantity of a light beam on the surface of a photosensitive body, due to dust adhering to the emission window, is confined to within a predetermined ratio by adjusting the distance between the emission window of the laser light and the photosensitive body and a spot diameter of the light beam on the photosensitive body (e.g. see Patent Document 3).

However in the above mentioned prior art, a configuration to deflect the laser light, not in the vertical plane direction, but in the horizontal plane direction for scanning is disclosed, however an optimum configuration to scan with laser light in the vertical plane direction, which can be applied to a thin LCD backlight and liquid crystal display device, is not disclosed in concrete terms.

In other words, a conventional laser printer or the like is not thin and upright, and as a typical layout of the optical system is a device, the laser optical system is disposed on an optical board that is placed approximately horizontal in an enclosure. Therefore the laser light is guided on a same horizontal plane, and is diagonally deflected downward at the end, targeting the photosensitive body, so the normal line directions of the entrance plane and emission plane of the laser light of each optical component inevitably become lower than the horizontal direction. Therefore even if a plurality of laser sources having different wavelengths are used, dust is hardly deposited in this structure.

If an optical system of an LCD backlight is constructed using a laser light, on the other hand, a thin liquid crystal TV can be constructed by disposing an optical system on the rear face of the liquid crystal panel in a state where the optical board is vertically disposed. In this case, dust deposits on the side face of each optical component constituting the optical system, and if dust is deposited on the side face where a laser light transmits, the brightness of the LCD backlight drops caused by the drop in laser light transmittance because of dust, or unevenness brightness occurs generated by a partial eclipse of the laser light due to dust.

In the case of a laser printer, the intensity of the laser light to be used is low, at the milliwatt level, and infrared light is often used, but in the case of a liquid crystal TV, a watt level high power light source is used, and a blue short wavelength light source is included, which causes dust to easily adhere to the surface of the optical component due to induced static electricity thereon.

Patent Document 1: Japanese Patent Application Laid-Open No. S53-142247

Patent Document 2: Japanese Patent Application Laid-Open No. S61-270772

Patent Document 3: Japanese Patent Application Laid-Open No. 2002-337386

SUMMARY OF THE INVENTION

It is an object of the present invention to provide a highly reliable liquid crystal display backlight free from a drop in brightness and uneven brightness due to the deposit of dust on an optical component, while maintaining a thin construction.

An liquid crystal display backlight according to one aspect of the present invention has: a laser light source unit that emits laser light; a transforming optical system that transforms a laser light from the laser light source unit into a linear light;

and a light guiding plate that allows the linear light to enter and emits a two-dimensional light in the horizontal direction. A light emission surface of the laser light source unit is disposed in a rear face side of the light guiding plate so that a surface normal line thereof is in the horizontal direction, or is inclined downward from the horizontal direction, the transforming optical system includes a stationary optical component that does not have a movable portion, and the stationary optical component is disposed in the rear face side of the light guiding plate so that surface normal lines of a light transmission surface and a light reflection surface thereof are all in the horizontal direction or are inclined downward from the horizontal direction.

According to the above configuration, a highly reliable liquid crystal display backlight free from a drop in brightness and brightness unevenness due to the deposit of dust on an optical component can be implemented, while maintaining a thin construction.

DETAILED DESCRIPTION OF THE INVENTION

Embodiments of the present invention will now be described with reference to the drawings. The same composing elements are denoted with the same reference symbols, for which description in some cases may be omitted. The drawings show mainly each composing element to assist in understanding, and forms, etc. are not accurate representations.

Embodiment 1

Figure 1:
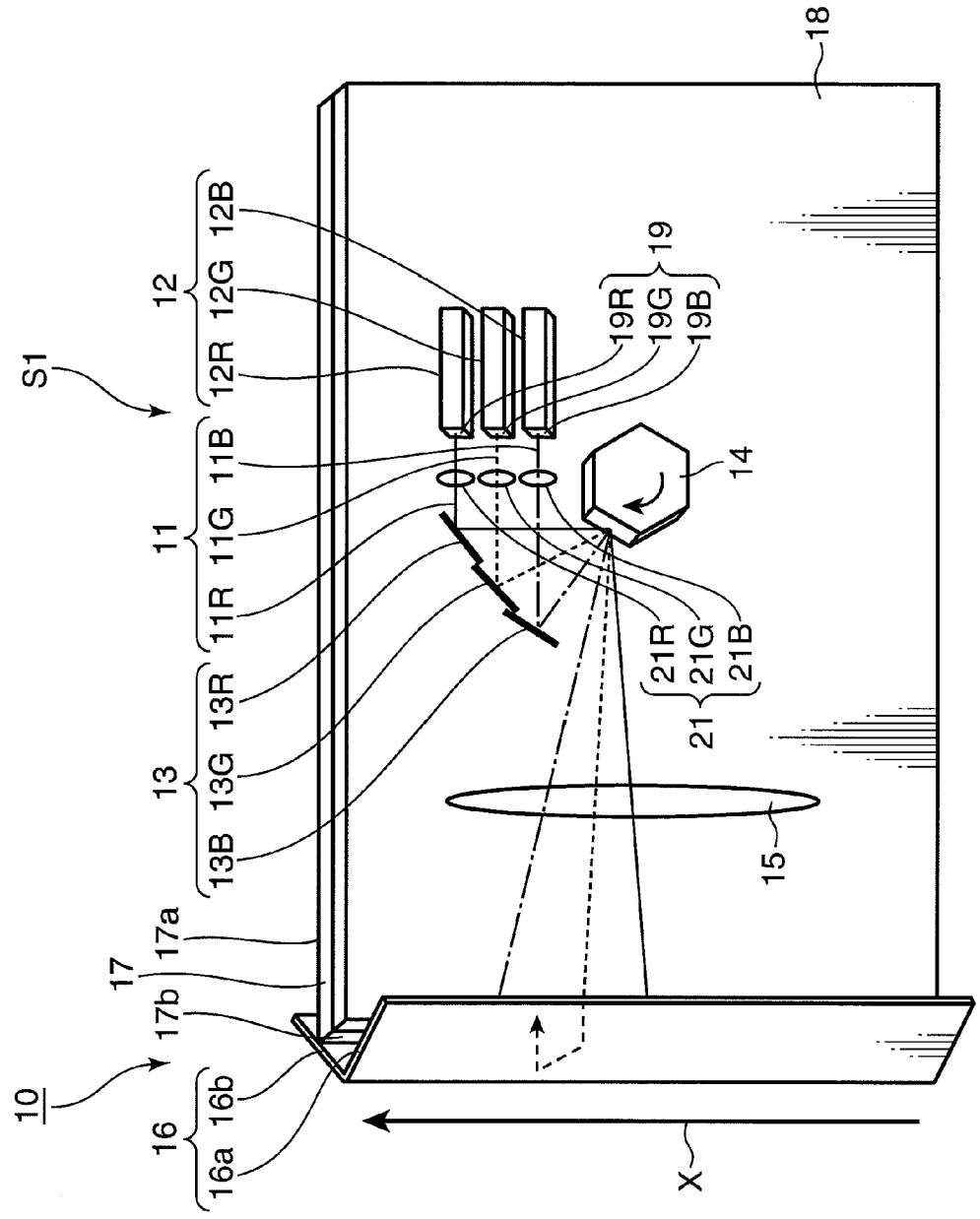
FIG. 1 is a perspective view depicting a general configuration of an LCD backlight according to Embodiment 1 of the present invention.

FIG. 1 is a diagram depicting a general configuration of an LCD backlight 10 according to Embodiment 1 of the present invention. This LCD backlight 10 has a plurality of light source 12 (red light source 12R, green light source 12G and blue light source 12B) that emit a plurality of laser lights 11 (red laser light 11R, green laser light 11G and blue laser light 11B), a plurality of lenses 21 (red laser light lens 21R, green laser light lens 21G and blue laser light lens 21B), a plurality of mirrors 13 (red laser light reflection mirror 13R, green laser light reflection mirror 13G and blue laser light reflection mirror 13B), a rotary polygon mirror 14, scanning lens 15, return mirror 16 (front side return mirror 16a and rear side return mirror 16b), light guiding plate 17, and optical board 18 that supports each optical component.

In the LCD backlight 10 of Embodiment 1, a transforming optical system is constituted by the lenses 21, mirrors 13, rotary polygon mirror 14, scanning lens 15 and return mirror 16, and for example, the light source 12 corresponds to an example of the laser light source unit, and the light source 12, lenses 21, mirrors 13, rotary polygon mirror 14 and scanning lens 15 are disposed on the optical board 18 in the rear face side of the light guiding plate 17, the lenses 21, mirrors 13 and scanning lens 15 correspond to an example of the stationary optical components not having a movable portion, the return mirror 16 corresponds to an example of the reflection element that is disposed in the side face 17b side of the light guiding plate 17, the entrance surface and emission surface of the lens 21 and the entrance surface and emission surface of the scanning lens 15 correspond to an example of the light transmission surface of the stationary optical component, the reflection surface of the mirror 13 corresponds to an example of the light reflection surface of the stationary optical component, the emission end face 19 of the light source 19 corresponds to an example of the light emission surface of the laser light source unit, and the reflection surface of the return mirror 16 corresponds to an example of the light reflection surface of the reflection element.

Now the operation of this LCD backlight will be described. The red light source 12R, green light source 12G and blue light source 12B are vertically disposed in a row, and each laser light 11 is emitted from the emission end face 19 (red laser light emission end face 19R, green laser light emission end face 19G and blue laser light emission end face 19B) of each light source 12. Each laser light 11 that is emitted from the light source 12 enters the mirror 13 while being condensed by the lens 21, and is reflected toward the rotary polygon mirror 14 at an angle that is different depending on each color, red, blue and green. By the rotary polygon mirror 14 rotating in the arrow direction in FIG. 1, the laser light 11 that entered the rotary polygon mirror 14 is reflected and deflected, and enters the scanning lens 15 as scanning light. For the scanning lens 15, a lens group for making the scanning velocity uniform on the scanning surface, such as an fθ lens, for example, can be used. The scanning lens 15 is illustrated as one lens, but can be a plurality of lenses.

The return mirror 16 consists of the front side return mirror 16a and the rear side return mirror 16b of which long sides are connected, and is disposed in the side face 17b side of the light guiding plate 17, and is secured to the optical board 18 directly or via a predetermined support element, which is not illustrated. The laser light 11 that transmitted through the scanning lens 15 in the X direction in FIG. 1 changes its direction 180° by the return mirror 16, and enters the light guiding plate 17 via the side face 17b of the light guiding plate 17.

The scanning range for the side face 17b of the light guiding plate 17 is preferably only on the side face 17b of the light guiding plate 17 for red, blue and green respectively, and then highly efficient LCD backlight can be constructed since an area outside the side face 17b of the light guiding plate is not scanned. The red laser light 11R, green laser light 11G and blue laser light 11B enter the rotary polygon mirror 14 at different angles from one another, and by changing the positions of entry from one another, a same area can be scanned even if the timings to scan the side face 17b of the light guiding plate 17 are different. The light guiding plate 17 is thin, normally a 10 mm or less thickness, so a function having a lens power in the thickness direction of the light guiding plate 17 may be provided to the scanning lens 15, so that light is condensed in the thickness direction on the light guiding plate 17.

The light guiding plate 17 includes a plurality of diffusion particles for diffusing the light inside thereof, and diffusion beads constituted by micro-meter order particles, for example, can be used for the diffusion particles. The laser light 11 that entered from the side face 17b of the light guiding plate 17 to the light guiding plate 17 is diffused by the diffusion beads in the light guiding plate 17, and emitted from the emission surface 17a (back of page face) of the light guiding plate 17 as two-dimensional illumination light. A reflection film or the like may be formed on the rear face of the light guiding plate 17 (plane between the light guiding plate 17 and the optical board 18).

As mentioned above, the cross-section of the laser light 11 immediately after emission from the light source 12 is a dot, but by transmitting through the transforming optical system, the laser light 11 is transformed into laser light of which cross-section is a line, and enters the light guiding plate 17, and the laser light 11 which entered the light guiding plate 17 is transformed into laser light of which cross-section is a plane, and two-dimensional light is emitted from the light guiding plate 17.

The LCD backlight 10 here is used as the backlight of the liquid crystal display device, such as a liquid crystal TV, and since the liquid crystal display device is normally viewed in a state of the screen positioned vertically up, this LCD backlight 10 is also installed in a state where the optical board 18 vertically stands up. In the present embodiment, it is assumed that the long side direction of the emission surface 17a of the light guiding plate 17 (left-right direction in the drawings) or the thickness direction of the light guiding plate 17 (depth direction in the drawings) is the horizontal direction, and the short side direction of the emission surface 17a of the light guiding plate 17 (top-down direction in the drawings) is the vertical direction. Therefore the laser light 11 emitted from the light guiding plate 17 is emitted in the horizontal direction as two-dimensional light.

Figure 2:
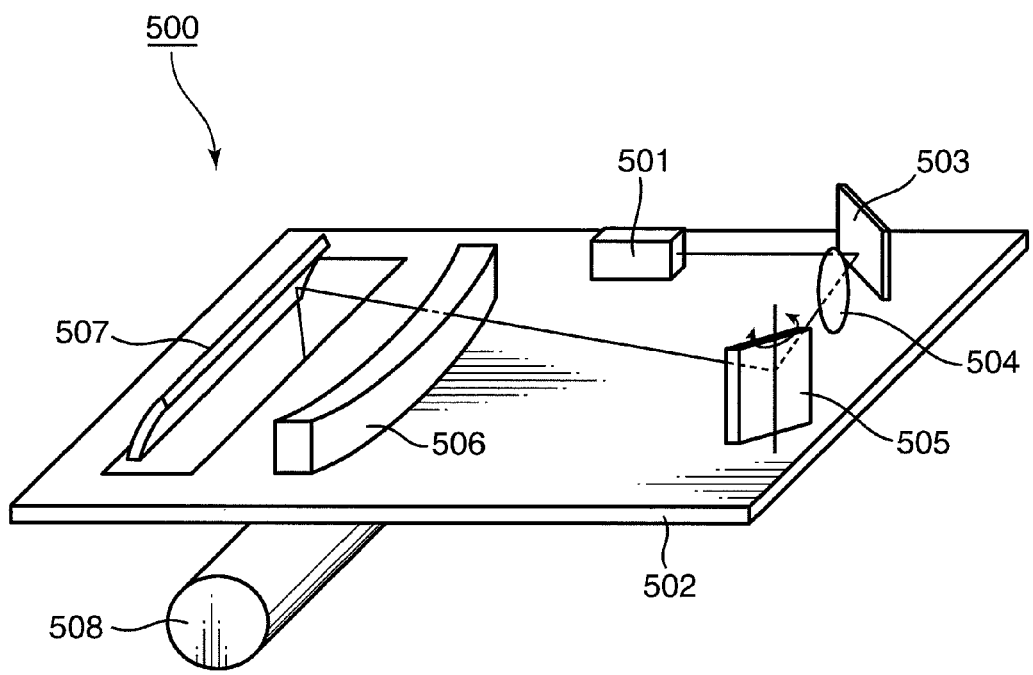
FIG. 2 is a diagram depicting a configuration of a general scanning optical system.

Generally in the scanning optical system used for a conventional laser printer, as shown in the scanning optical system 500 in FIG. 2 as a typical example, a light source 501, return mirror 503, lens 504, scanner 505, scanning lens 506 and scanning mirror 507 are disposed on an optical board 502 that is placed approximately horizontal, and the laser light emitted from the light source 501 is raster-scanned on a photosensitive drum 508.

Since the optical board 502 is placed approximately horizontal in this case, the normal line directions of the surfaces where the laser light is transmitted or reflected in each optical component are all in the horizontal direction or are inclined downward from the horizontal direction, so in this state, little dust is deposited on the transmission surface or reflection surface of the laser light. However if the optical board 502 in this structure is raised up to approximately vertical, so that the long side direction of the optical board 502 becomes horizontal, then the normal direction of the transmission surface of the lens 504 becomes vertical, and dust is deposited on the laser light entrance surface of the lens 504. As a result, the laser light is interfered with by the deposited dust, and a drop in brightness and uneven brightness are caused by the drop in laser light quantity, therefore the conventional configuration of the scanning optical system that is used for a laser printer or the like cannot be used for the LCD backlight.

Therefore according to this LCD backlight 10, the emission end face 19 of the light source 12, which is a laser light source unit, is disposed so that the surface normal line direction thereof is the horizontal direction or is inclined downward from the horizontal direction, and the lens 21, mirror 13 and scanning lens 15, which are stationary optical components, and the return mirror 16, which is a reflection element, are disposed so that the surface normal line direction of the transmission surface or reflection surface of each laser light 11 is the horizontal direction or is inclined downward from the horizontal direction, that is the angle formed by the surface normal direction and the gravity direction becomes 90° or less. If the transmission surface or reflection surface is a spherically curved surface, the surface normal line thereof means a straight line perpendicular to the tangential line at the central point of the optical axis of the transmission surface or reflection surface.

For example, according to the present embodiment, the light source 12 is disposed so that the surface normal line direction of the emission end face 19 is the horizontal direction, the lens 21, scanning lens 15 and return mirror 16 are disposed so that the surface normal line direction of the transmission surface or reflection surface of the laser light 11 is the horizontal direction, and the mirror 13 is disposed so that the normal line direction of the reflection surface of the laser light 11 is inclined downward from the horizontal direction.

By this configuration, the deposit of dust floating in the liquid crystal display device, on the emission end face 19 of the light source 12, on each stationary optical component in the transforming optical system, and on the transmission surface or reflection surface of the laser light of the return mirror 16 can be prevented. Hence by using this LCD backlight 10 for a liquid crystal display device, a highly reliable liquid crystal display device free of a drop in brightness or a generation of uneven brightness due to a dust deposit, even after long term use, can be constructed.

In the transforming optical system, the normal line of a reflection surface of the rotary polygon mirror 14, which is a movable optical component having a movable portion, comes above the horizontal direction, but even if dust is temporarily deposited on this surface, dust drifts away by the rotation of the rotary polygon mirror 14, and causes no problems.

In the case of using a plurality of light sources for the light source 12, just like the case of this LCD backlight 10, it is preferable that the principal rays of each laser light 11R, 11G and 11B never overlap in the configuration, then the surface normal line direction of the transmission surface or reflection surface of each optical component is the horizontal direction or is inclined downward from the horizontal direction, so the LCD backlight 10, free from a drop in brightness and generation of uneven brightness due to the deposit of dust, can be constructed.

In FIG. 1, the principal rays of the red laser light 11R, green laser light 11G and blue laser light 11B are indicated by a solid line, dotted line and dashed line respectively. In the present description, an "overlap" of principal rays means that two line segments, out of the solid line, dotted line and dashed line, exist at a same position in a predetermined length of an area, and this is different from a "cross" of principal rays at one point. For example, in FIG. 1, the red laser light 11R reflected by the red laser light reflection mirror 13R and the green laser light 11G, before being reflected by the green laser light reflection mirror 13G, "cross" but do not "overlap".

Figure 3:
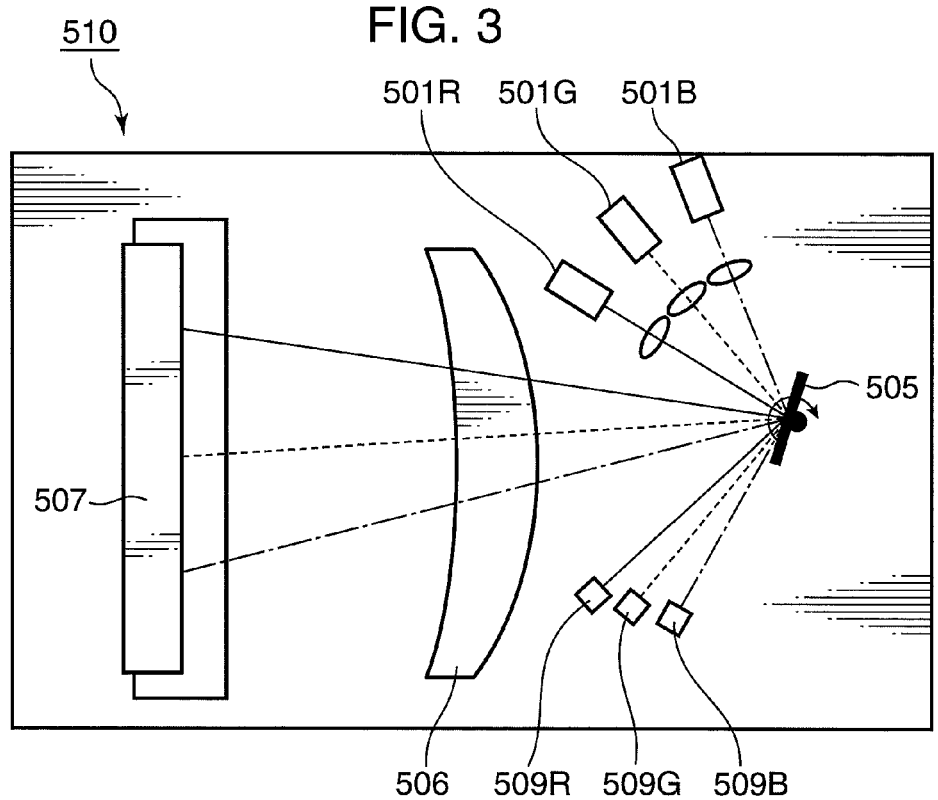
FIG. 3 is a diagram depicting a general configuration of the scanning optical system when a plurality of light sources are used without multiplexing.

In a laser printer, normally recording start timing must be detected using an optical sensor, but when scanning is performed using laser light sources 501R, 501G and 501B having different wavelengths, as in the case of the scanning optical system 510 in FIG. 3, a sensor corresponding to each laser source is required in order to distinguish the recording timing for each wavelength, if each laser light is used for scanning without being multiplexed. In the case of the scanning optical system 510 in FIG. 3, the sensor 509R is required for the laser light source 501R, sensor 509G for the laser light source 501G, and sensor 509B for the laser light source 501B, which makes the configuration complicated and adds high cost.

Figure 4:
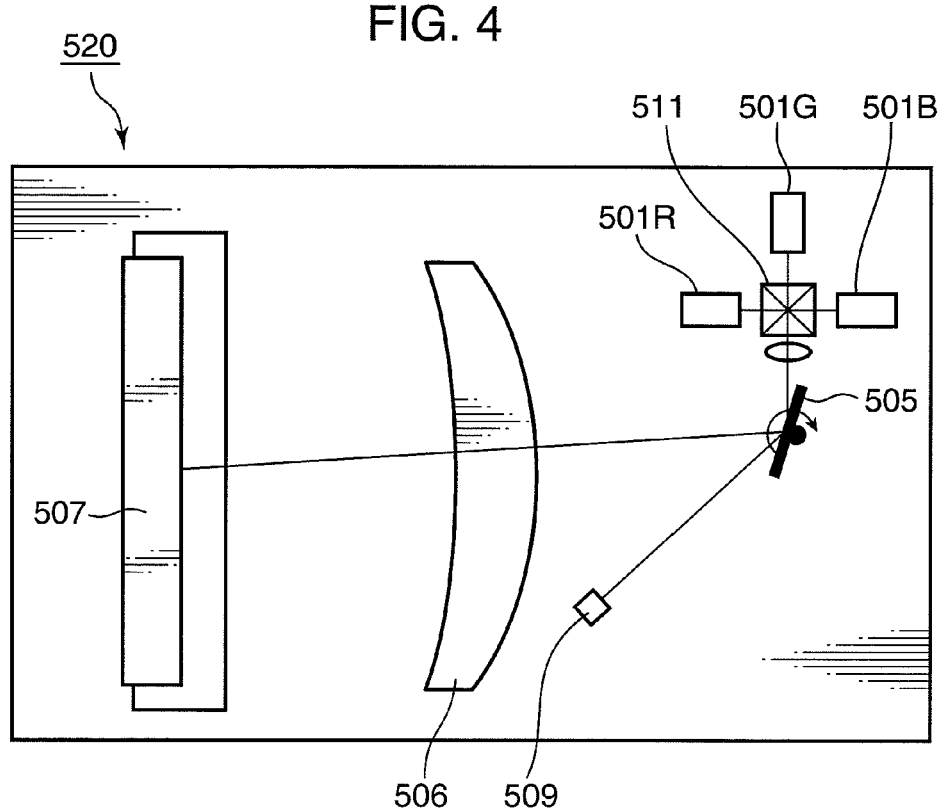
FIG. 4 is a diagram depicting a general configuration of the scanning optical system when a plurality of light sources are used with multiplexing.

Hence it is preferable in terms of simplicity and cost to multiplex (superimpose) the laser lights from the laser light sources 501R, 501G and 501B, using a cross-prism 511 (or dichroic mirror) before scanning, and detect the multiplexed laser light using a single sensor 509, as shown in the scanning optical system 520 in FIG. 4. However if the cross-prism 511 is disposed in the rear face side of the light guiding plate 17, and the three laser lights from the three laser light sources are multiplexed, as in the case of the scanning optical system 520, at least one surface of the cross-prism 511 is in the horizontal direction, and dust is deposited on this surface.

The scanning optical system of this LCD backlight 10, on the other hand, is an illumination optical system which does not require detecting the recording start timing, so multiplexing which is normally required is unnecessary, and not multiplexing, in other words, not superimposing the principal ray of each laser light can prevent a drop in brightness due to the deposit of dust, and makes optical components for multiplexing unnecessary, which is advantageous in terms of cost. In this way, by using the configuration of not superimposing the principal ray of each laser light, a highly reliable backlight free from a drop in brightness due to the deposit of dust can be constructed at low cost without using multiplexing elements, such as a dichroic mirror and cross-prism.

It is possible to multiplex each laser light in a state where dust is not deposited, by stacking the light sources 12 in the thickness direction of the light guiding plate 17, but in this case, the light source portion of the LCD backlight becomes thicker, which makes it difficult to construct a thin LCD backlight. In order to construct a highly reliable LCD backlight free from a drop in brightness due to the deposit of dust, while maintaining a thin construction, it is preferable to dispose the light source 12 in the rear face side of the light guiding plate 17 (e.g. disposed in a row on the stationary surface of the optical board 18 along the top-bottom direction) without stacking in the thickness direction of the light guiding plate 17, so that the principal ray of each laser light is not superimposed.

Figure 5:
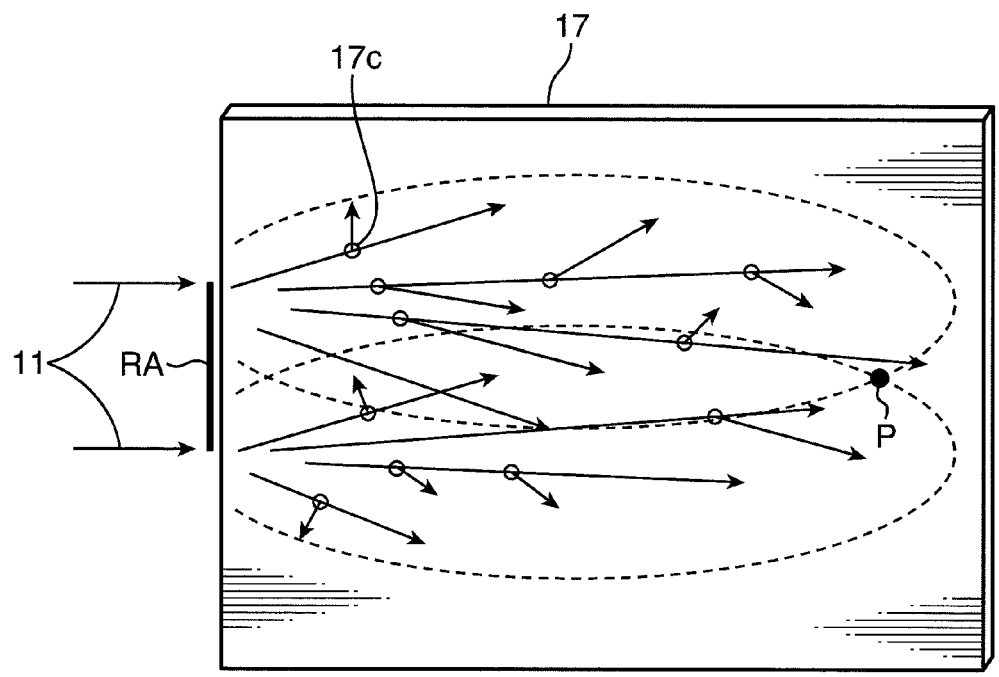
FIG. 5 is a diagram depicting a concept of light diffusion in a light guiding plate including the diffusion particles inside.

In the LCD backlight 10, scattering particles are included inside the light guiding plate 17, as mentioned above. FIG. 5 is a diagram depicting a concept of the diffusion of light in the light guiding plate including the diffusion particles inside. As FIG. 5 shows, the laser light 11 that entered from the side face of the light guiding plate 17 repeats reflection in the light guiding plate 17 by a plurality of scattering particles 17c, and is emitted from a wide range (e.g. area circled by the dotted line in FIG. 5) of the light guiding plate 17. For example, in point P on the light guiding plate 17, all the laser lights that enter the area RA between two laser lights 11 enter from the side face of the light guiding plate 17, contribute slightly to emission respectively. Therefore even if micro-dust adheres to the side face of the light guiding plate 17, an uneven brightness is hardly recognized visually, and the LCD backlight 10 becomes a highly reliable LCD backlight which is hardly affected by dust, in terms of uneven brightness.

On the point P, all the laser lights, which enter the area RA between the two laser lights 11 entered from the side face of the light guiding plate 17, contribute to emission, and the speckle pattern changes depending on the entering position of the laser light 11, so an LCD backlight of which speckle pattern is hardly recognized visually can be constructed.

Figure 6:
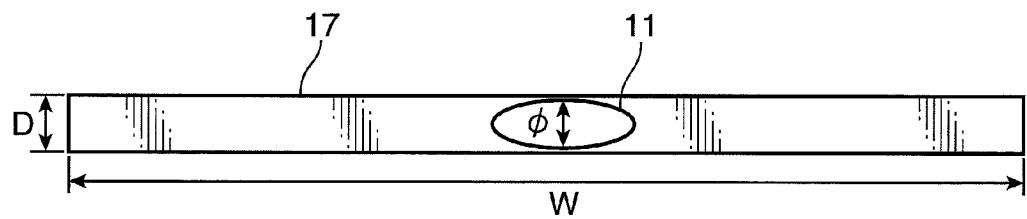
FIG. 6 is a diagram depicting a beam diameter in the laser light entrance side face of the light guiding plate.

As FIG. 6 shows, according to the LCD backlight 10, the beam diameter $\phi$ in the thickness direction of the laser light 11, that enters the light guiding plate 17, is set to be 90% or more (preferably 95% or more, more preferably 98% or more) of the thickness D of the light guiding plate 17 in at least one location in the scanning area W. By setting the beam diameter $\phi$ in the thickness direction to be large with respect to the thickness D of the light guiding plate 17, the ratio of the quantity of light, interrupted by the adhering dust, to the laser light 11 illuminating the side face of the light guiding plate 17, can be decreased even if dust is adhering to the side face where the laser light 11 of the light guiding plate 17 enters, so uneven brightness on the two-dimensional distribution of the laser light that is emitted from the light guiding plate 17 can be further suppressed.

According to the LCD backlight 10, the light guiding plate 17 includes the diffusion particles inside, but whether the diffusion particles are included inside the light guiding plate 17 or not, setting the beam diameter φ in the thickness direction to be 90% of the thickness D of the light guiding plate 17, described above, is effective, and is not limited to the configuration of the light guiding plate.

Figure 7:
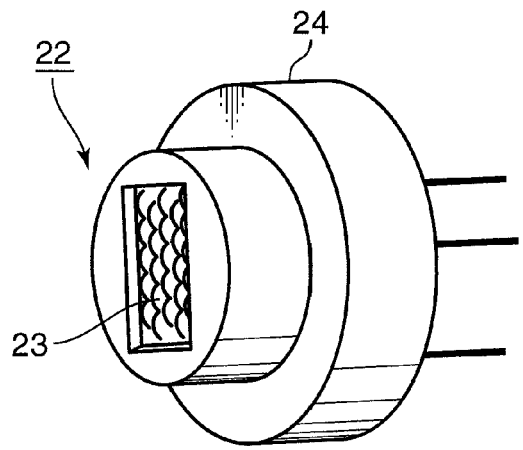
FIG. 7 is a diagram depicting a general configuration of an example of a semiconductor laser light source that is used for the LCD backlight according to Embodiment 1 of the present invention.

For the light source 12 of the LCD backlight 10, a semiconductor laser light source, in which a micro-lens array is formed on the cover glass, may be used, and in this case, an LCD backlight that can further prevent the adhesion of dust can be constructed. For example, as FIG. 7 shows, the semiconductor laser light source 22 is a laser light source where a semiconductor laser is sealed inside a CAN package 24, and a micro-lens array 23 is used as the cover glass.

Figure 8:
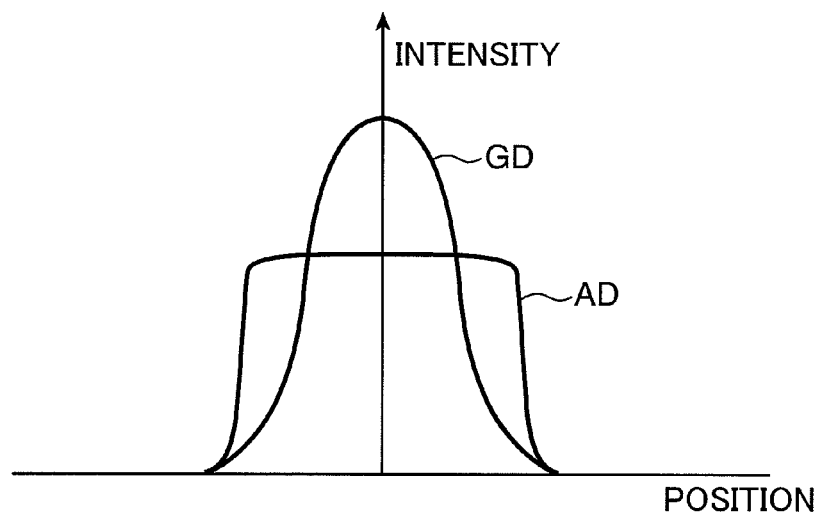
FIG. 8 is a graph depicting the intensity distribution of the laser light of the semiconductor laser light source shown in FIG. 7.

As mentioned above, a high power light source, at watt level, is used for the light source of the liquid crystal display device, and a blue light source having short blue wavelength is also included, so static electricity is generated around the optical path of the glass material surface due to the piezoelectric effect by the laser light absorption caused by the glass material, and dust tends to adhere due to the static electricity that is induced on the surface of the optical equipment. The power distribution of the laser light source, on the other hand, presents Gaussian distribution GD in many cases, as shown in FIG. 8, and the power density at the center portion is higher than the peripheral portions. The power distribution of the laser light that is emitted from the semiconductor laser light source 22, however, presents a distribution AD having a uniform intensity, as shown in FIG. 8, because the laser light passes through the micro-lens array 23.

In this case, the power density at the center portion drops while total power is maintained to be the same, so in all optical components that exist downstream of the semiconductor laser light source 22, where laser light emitted from the semiconductor laser 22 is transmitted or reflected, dust adhesion due to static electricity can be prevented, and a highly reliable LCD backlight 10, in which a drop in brightness is suppressed, can be constructed.

Figure 9:
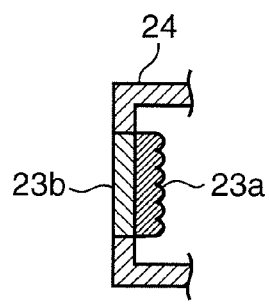
FIG. 9 is a diagram depicting a general configuration of an example of another semiconductor laser light source that is used for the LCD backlight according to Embodiment 1 of the present invention.

A method for creating the micro-lens array is not limited to the above example, but as shown in FIG. 9, for example, the micro-lens array 23a may be created inside the CAN package 24, whereby the laser light intensity distribution outside the cover glass 23b, contacting the outside air containing dust, can be flatter than the Gaussian distribution. In this case, the adhesion of dust due to static electricity can be further prevented, and a highly reliable LCD backlight 10, in which a drop in brightness is further suppressed, can be constructed. The effect of the semiconductor laser light source 22 or the like is not limited to the LCD backlight according to Embodiment 1, but the same effect can be expected even if the semiconductor laser light source 22 or the like is used for other LCD backlights. The micro-lens array may be constructed separately from the cover glass, or can be integrated with the cover glass, as mentioned above.

Figure 10:
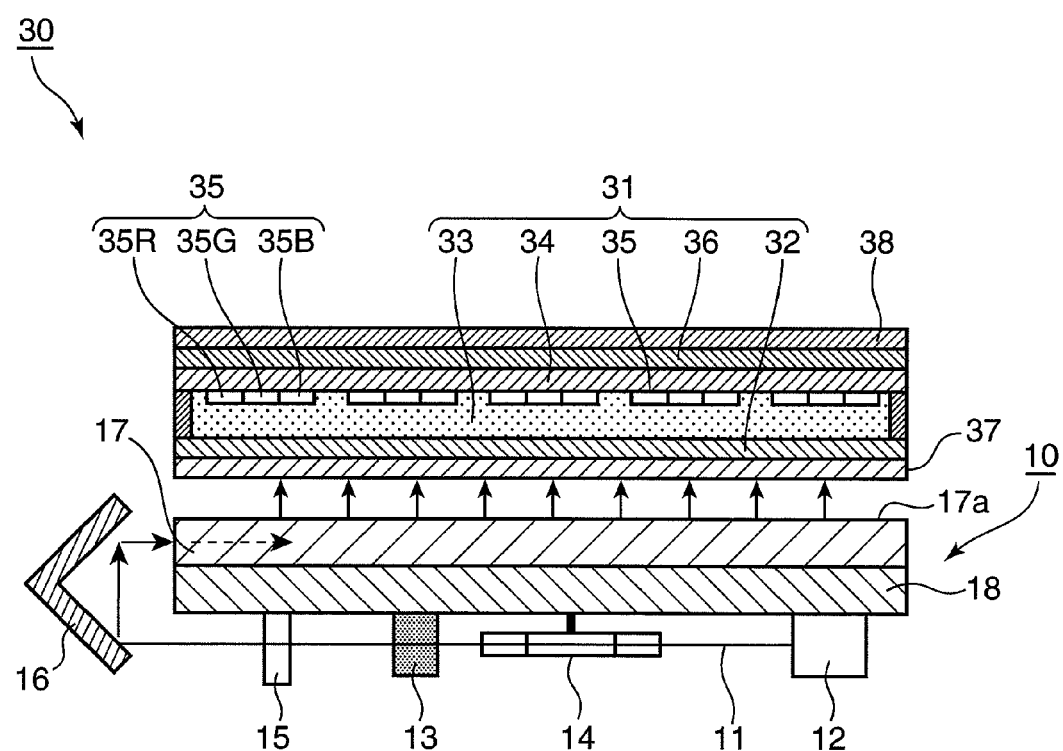
FIG. 10 is a cross-sectional view depicting a general configuration of a liquid crystal display device using the LCD backlight according to Embodiment 1 of the present invention.

Now a liquid crystal device using the LCD backlight 10 according to the present embodiment will be described. FIG. 10 is a cross-sectional view depicting a general configuration of a liquid crystal display device using the LCD backlight according to Embodiment 1 of the present invention. The liquid crystal display device 30 has an LCD backlight 10 and a liquid crystal display panel 31, and FIG. 10 shows a state when the liquid crystal display panel 31 is being exposed with a laser light emitted from the emission surface 17a of the light guiding plate 17, and in the cross-sectional view when the LCD backlight 10 in FIG. 1 is viewed from the top.

The liquid crystal display panel 31 is comprised of an entrance side polarizer film 37, glass substrates 32 and 34, liquid crystal layer 33, color filter 35, emission side polarizer film 36 and diffusion plate 38, and the color filter 35 is constituted by a red light color filter 35R, green light color filter 35G and blue light color filter 35B. The laser light emitted from the LCD backlight 10 is transformed into a single polarization via the entrance side polarizer film 37, then transmits through the liquid crystal layer 33 via the glass substrate 32, and the polarizing direction is rotated according to the image data. Then the light of which unnecessary color is removed by the color filter 35 transmits through the glass substrate 34 and the emission side polarizer film 36, and finally is emitted with spreading the angle of view by the diffusion plate 38 for viewing.

Generally speaking, an image display device, such as a TV, installed in a home is exposed to room dust, so dust accumulates inside the TV if several years pass without any dust countermeasures. For example, the optical system of the LCD backlight can be covered in a well ventilated state by a louver, so that the amount of dust that accumulates on an LCD backlight is decreased. However if additional dust countermeasures are included, an LCD backlight having higher reliability can be constructed. This liquid crystal display device 30 has a configuration to prevent the accumulation of dust, as shown in the LCD backlight 10, therefore such a problem as a drop in light quantity due to the accumulation of dust does not occur even after long term use, and a highly reliable liquid crystal display device, in which the generation of uneven brightness due to dust is suppressed, can be constructed with low cost.

In the liquid crystal display device 30, a laser is used for the light source, so a liquid crystal display device that has a wider color reproduction range and has a higher image quality can be constructed compared with a liquid crystal display device equipping a backlight using a cold-cathode tube and LED. For the scanning of laser light, a reflection deflecting element, such as a galvano mirror and MEMS mirror, may be used instead of a rotary polygon mirror.

Embodiment 2

Figure 11:
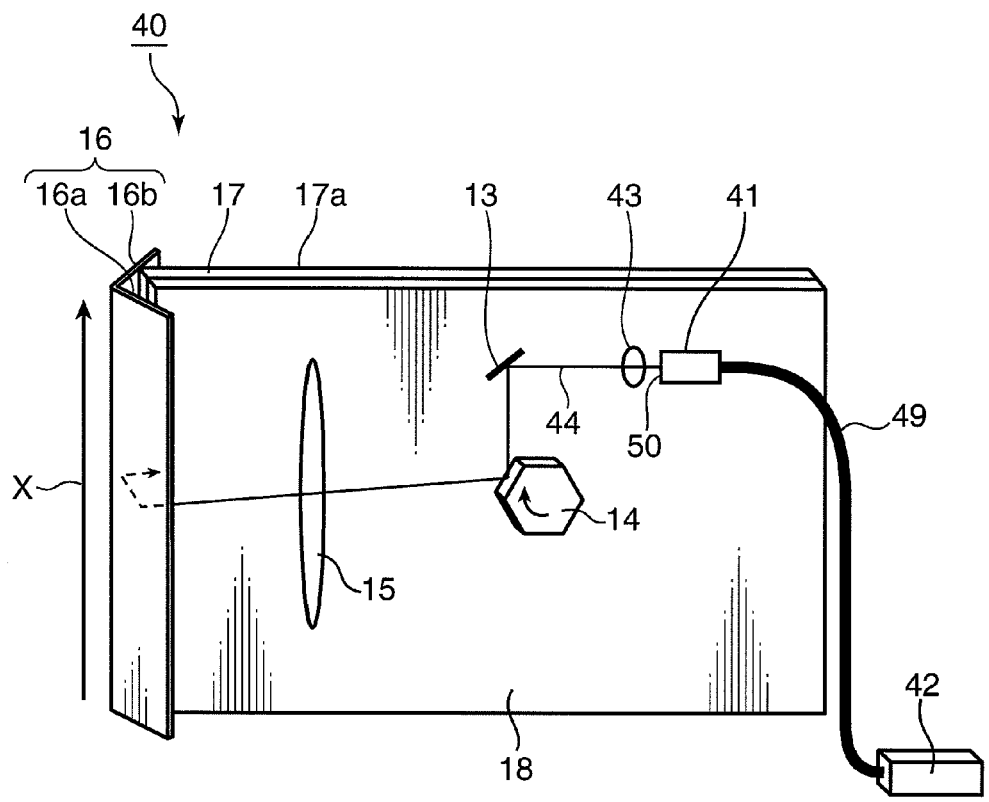
FIG. 11 is a perspective view depicting a general configuration of an LCD backlight according to Embodiment 2 of the present invention.
Figure 12:
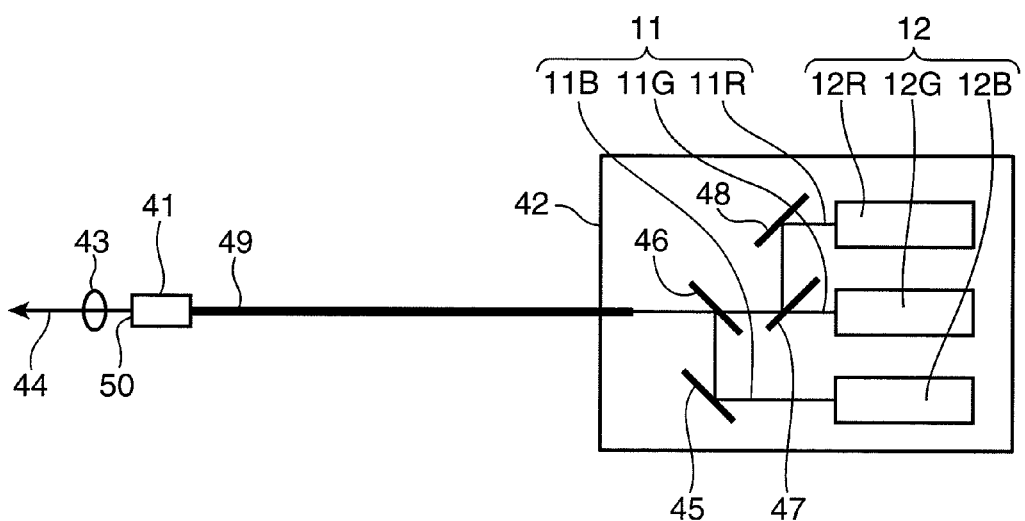
FIG. 12 is a diagram depicting a general configuration around the light source of the LCD backlight shown in FIG. 11.

FIG. 11 is a perspective view depicting a general configuration of an LCD backlight 40 according to Embodiment 2 of the present invention, and FIG. 12 is a diagram depicting a general configuration around the light source of the LCD backlight shown in FIG. 11. This LCD backlight 40 has a configuration similar to the LCD backlight 10 according to Embodiment 1, but a difference from Embodiment 1 is that a light source unit 42, which is disposed separately from the rear face portion of the light guiding plate 17, a fiber (optical fiber) 49, an emission end portion 41 of the fiber 49 and a fiber collimator 43, are equipped as the composing elements. Another difference from Embodiment 1 is that the light source unit 42 has a blue laser light reflection mirror 45, red laser light reflection mirror 48 and dichroic mirrors 46 and 47, in addition to the plurality of light sources 12 (red light source 12R, green light source 12G and blue light source 12B), and the laser light that is emitted from an emission end face 50 of the emission end portion 41 of the fiber 49 is the white light 44.

The operation of this LCD backlight 40 will now be described focusing on the differences from the LCD backlight 10 of Embodiment 1. As mentioned above, this LCD backlight 40 has a light source unit 42, which is disposed separately from the rear face portion of the light guiding plate 17, as a light source. The light source unit 42 has the light source 12 inside (red light source 12R, green light source 12G and blue light source 12B), as shown in FIG. 12, and out of the laser light 11 emitted from the light source 12, the red laser light 11R is reflected by the red laser light reflection mirror 48, and is then reflected again by the dichroic mirror 47, and is multiplexed with the green laser light 11G emitted from the green light source 12G. The blue laser light 11B emitted from the blue light source 12B is reflected by the blue laser light reflection mirror 45, and is then reflected by the dichroic mirror 46, and is multiplexed with the red laser light 11R and green laser light 11G, and coupled with the fiber 49.

Each laser light 11 propagated through the fiber 49 is emitted from the emission end portion 41 as a white light 44 in which three colors are mixed, and is transformed into substantially parallel light by the fiber collimator 43. The white light 44, which was transformed into a substantially parallel light by the fiber collimator 43, is reflected by the mirror 13, and is deflected and scanned by the rotary polygon mirror 14. The subsequent operation is the same as the LCD backlight 10, except that the three colors of the laser lights have become one white light 44.

In the LCD backlight 40 according to Embodiment 2, the light source unit 42, fiber 49 and emission portion 41 constitute the laser light source unit, and the transforming optical system includes the fiber collimator 43, mirror 13, rotary polygon mirror 14, scanning lens 15 and return mirror 16. The output end portion 41, fiber collimator 43, mirror 13 and scanning lens 15 are installed on the optical board 18 in the rear face side of the light guiding plate 17, and the fiber collimator 43, mirror 13 and scanning lens 15 correspond to an example of the stationary optical component that does not have a movable portion, the return mirror 16 corresponds to an example of the reflection element that is disposed in the side face side of the light guiding plate, the entrance surface and emission surface of the fiber collimator, and the entrance surface and emission surface of the scanning lens 15 correspond to an example of the light transmission surface of the stationary optical component, the reflection surface of the mirror 13 corresponds to an example of the light reflection surface of the stationary optical component, the emission end face 50 of the emission end portion 41 corresponds to an example of the light emission surface of the laser light source unit, and the reflection surface of the return mirror 16 corresponds to an example of the light reflection surface of the reflection element. Here it is preferable that the fiber collimator 43 and the scanning lens 15 are achromatic lens.

As mentioned above, by disposing the light source unit 42 in a position distant from the rear face portion of the light guiding plate 17, three colors of the laser lights can be multiplexed in a state where a plurality of light sources 12 are arrayed on a horizontal surface inside the light source unit 42. As a result, the surface normal line directions of the reflection surface and transmission surface of each dichroic mirror 46 and 47 and the surface normal line directions of the reflection surfaces of the blue laser light reflection mirror 45 and red laser light reflection mirror 48 can always turn to the horizontal direction, therefore the deposit of dust on the transmission surface and reflection surface of the laser light can be prevented. Even if a lens, which is not illustrated, is used for coupling with the fiber 49, the surface normal line of the transmission surface of the laser light of this lens can be turned to the horizontal direction, so the dust does not deposit on the transmission surface of the laser light and a highly reliable LCD backlight, free from a drop in brightness due to the decrease of transmittance, can be constructed.

Since the white light 44 enters the transforming optical system in a state where the laser lights are already multiplexed in an area other than the rear face of the light guiding plate 17, multiplexing the laser lights in the rear face of the light guiding plate 17 is not required, so the emission end portion 41 of the fiber 49 can be disposed in the rear face side of the light guiding plate 17, so that the surface normal line direction of the emission end face 50 turns to the horizontal direction. For the other elements constituting the transforming optical system as well, the surface normal line direction of the reflection surface or transmission surface of the laser beam of the fiber collimator 43, scanning lens 15 and return mirror 16 can turn to the horizontal direction, and the surface normal line direction of the reflection surface of the mirror 13 can turn to the direction downward from the horizontal direction.

By this, the deposit of dust on the transmission surface or reflection surface of the laser light can be prevented, and a drop in light quantity from the emission surface 17a of the light guiding plate 17 due to the deposit of dust can be prevented even during long term use, therefore a highly reliable LCD backlight can be constructed.

In a transforming optical system, the normal line of a reflection surface of the rotary polygon mirror 14 comes above the horizontal direction, as mentioned in Embodiment 1, but even if dust is temporarily deposited on this surface, dust drifts away by the rotation of the rotary polygon mirror 14 and causes no problems.

Embodiment 3

Figure 13:
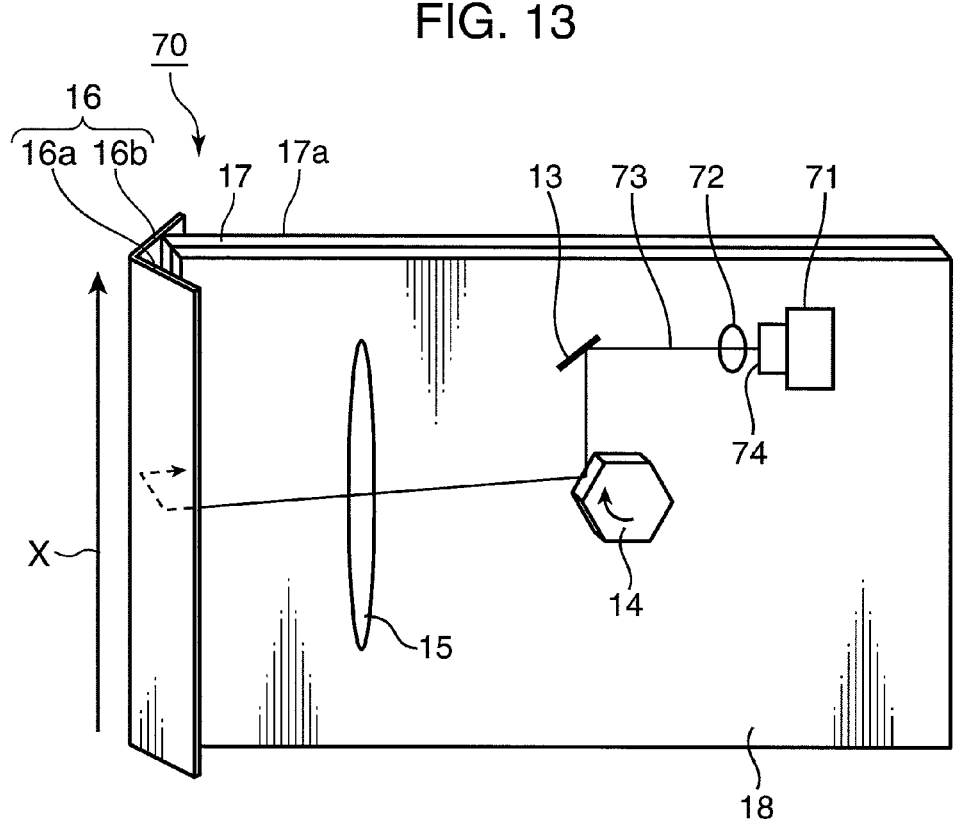
FIG. 13 is a perspective view depicting a general configuration of an LCD backlight according to Embodiment 3 of the present invention.

FIG. 13 is a diagram depicting a general configuration of an LCD backlight 70 according to Embodiment 3 of the present invention. This LCD backlight 70 has a configuration similar to the LCD backlight 40 according to Embodiment 2, but a difference is that a multi-light source 71, that is a plurality of lasers housed in an enclosure, is used for the light source, and the rest of the configuration is the same as the LCD backlight 40 of Embodiment 2.

The multi-laser light 73 emitted from the multi-light source 71 is transformed into substantially parallel light by the collimator 72, is then returned by the mirror 13, and deflected and scanned by the rotary polygon mirror 14. The multi-laser light 73 reflected by the rotary polygon mirror 14 is scanned in the X direction, and enters the light guiding plate 17 via the scanning lens 15 and return mirror 16. If this multi-light source 71 is a light source housing the red, blue and green semiconductor laser, for example, the multi-laser light 73 emits from the emission end face 74 of the multi-light source 71 as one white laser light. The subsequent operation is exactly the same as the case of scanning the white light 44 that is propagated using the fiber 49 when the LCD backlight 40 of Embodiment 2 is used, so detailed description is omitted. In this LCD backlight 70, it is preferable that the collimator 72 and scanning lens 15 are achromatic lens.

In the LCD backlight 70 according to Embodiment 3, the laser light source unit is constituted by the multi-light source 71, and the transforming optical system is constituted by a collimator 72, mirror 13, rotary polygon mirror 14, scanning lens 15 and return mirror 16, and all of these components are disposed on the optical board 18 in the rear face of the light guiding plate 17. In this way, if the multi-light source 71 is used for the light source of the LCD backlight 70, each laser light, red, blue and green have already been multiplexed in the stage of emission from the light source, and multiplexing laser lights in the rear face of the light guiding plate 17 is not required.

As a result, the surface normal line direction of the emission end face 74 of the multi-light source 71 can turn to the horizontal direction, and the surface normal line direction of the transmission surface or reflection surface of the multi-laser light 73 of the collimator 72, scanning lens 15 and return mirror 16 which is a reflection element, can turn to the horizontal direction, and the surface normal line direction of the reflection surface of the mirror 13, that is the stationary optical component, can turn to the direction downward from the horizontal direction. By this, the deposit of dust on the transmission surface or reflection surface of the laser light of each stationary optical component can be prevented, and emission light quantity from the emission surface 17a of the light guiding plate 17 does not fluctuate even during long term use, therefore a highly reliable LCD backlight can be constructed.

In a transforming optical system, the normal line of a reflection surface of the rotary polygon mirror 14 comes above the horizontal direction, but even if dust is temporarily deposited on this surface, dust drifts away by the rotation of the rotary polygon mirror 14, and causes no problems.

Embodiment 4

Figure 14:
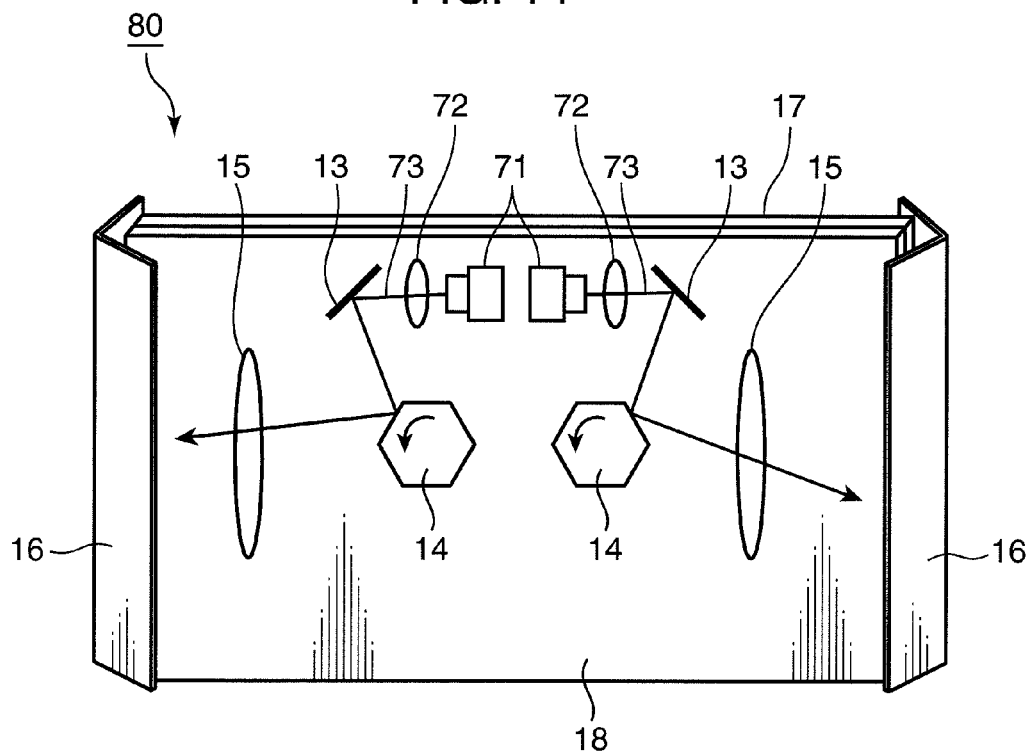
FIG. 14 is a perspective view depicting a general configuration of an LCD backlight according to Embodiment 4 of the present invention.

FIG. 14 is a diagram depicting a general configuration of an LCD backlight 80 according to Embodiment 4 of the present invention. The LCD backlight 80 has a configuration similar to the LCD backlight 70 shown in Embodiment 3, but a difference is that there are two laser light source units and transforming optical systems from the multi-light source 71 to the return mirror 16, which are disposed on the left and right sides of the optical board 18. The operation from emitting from the multi-light source 71 to entering the light guiding plate 17 is exactly the same as Embodiment 3, therefore description thereof is omitted.

As FIG. 14 shows, an LCD backlight, which excels in uniformity of brightness in the left-right direction of the light guiding plate 17 and implements high image quality, can be provided by allowing the multi-laser light 73 to enter from the left and right. Needless to say, in the present embodiment which uses the multi-light source 71, just like the LCD backlight 70, the surface normal line directions of the transmission surface or reflection surface of the multi-laser light 73 of the optical components constituting the transforming optical system are the horizontal direction or are inclined downward from the horizontal direction, so a highly reliable LCD backlight, free from a drop in brightness due to the deposit of dust, can be constructed.

Figure 15:
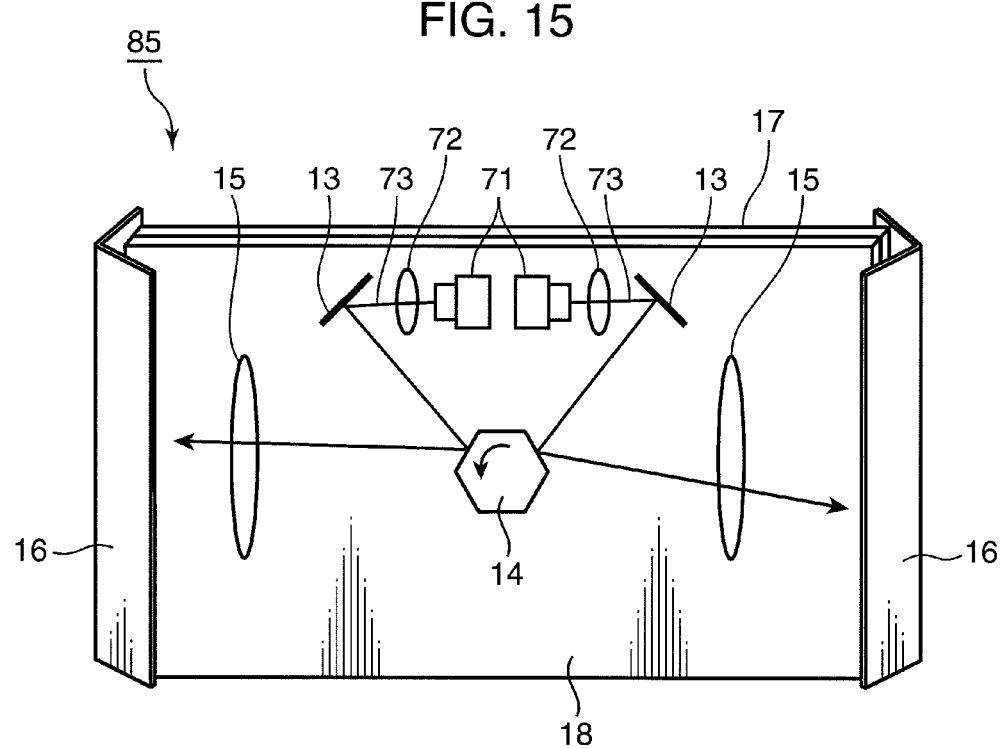
FIG. 15 is a perspective view depicting a general configuration of another LCD backlight according to Embodiment 4 of the present invention.

FIG. 15 is a diagram depicting a general configuration of another LCD backlight 85 according to Embodiment 4 of the present invention. This LCD backlight 85 is an optical system similar to the LCD backlight 80, but a difference is that a single rotary polygon mirror 14 is shared by two transforming optical systems. Since the rotary polygon mirror 14 has a plurality of surfaces, the multi-laser light 73 can be scanned in a plurality of directions using the single rotary polygon mirror 14, just like the LCD backlight 85. Therefore in this LCD backlight 85 as well, two effects similar to the LCD backlight 80, that is the prevention of a drop in brightness due to the deposit of dust, and making brightness more uniform, can be implemented, and in addition to this, such an LCD backlight can be implemented with lower cost and simpler configuration.

Figure 16:
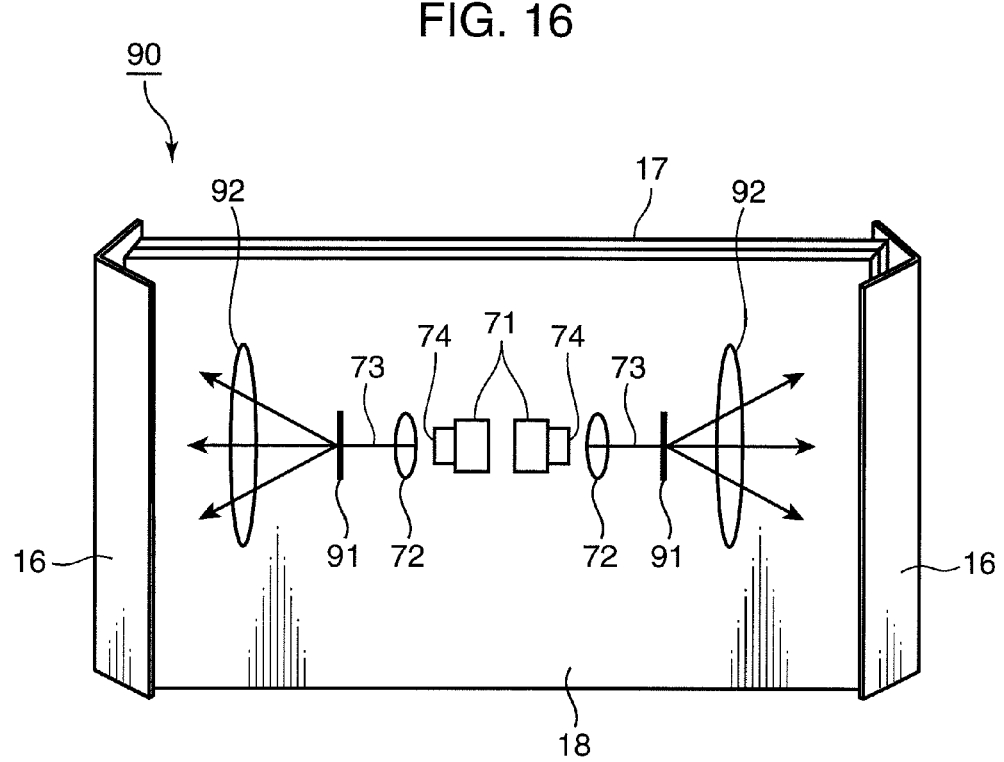
FIG. 16 is a perspective view depicting a general configuration of another LCD backlight according to Embodiment 4 of the present invention.

FIG. 16 is a diagram depicting a general configuration of another LCD backlight 90 according to Embodiment 4 of the present invention. This LCD backlight 90 has a similar configuration as the LCD backlight 80, that is there are two laser light source units and transforming optical systems from the multi-light source 71 to the return mirror 16, which are disposed on the left and right sides of the optical substrate 18, but a difference is that two line diffusers 91 are used, instead of the rotary polygon mirror 14.

The operation of this LCD backlight 90 will be described. The multi-laser light 73, omitted from the multi-light source 71, is transformed into substantially parallel light by the collimator 72, and enters the line diffuser 91. A line diffuser normally has a function to diffuse a laser light, of which cross-section is a dot, at a predetermined angle, and the line diffuser 91 used here has a function to transform the multi-laser light 73, of which cross-section is a dot, into a laser light of which cross-section is a line, and generates a linear light instead of the rotary polygon mirror 14 of the LCD backlight 80. The multi-laser light 73 that was transmitted through the line diffuser 91 is adjusted by the lens 92 so as to irradiate the side face of the light guiding plate 17, is returned by the return mirror 16, and enters the light guiding plate 17. The subsequent operation is exactly the same as the LCD backlight 80. The line diffuser may be constituted by a hologram lens sheet or aspherical lens.

In this LCD backlight 90, the emission end face 74 of the multi-laser light 73 corresponds to an example of the light emission surface of the laser light source unit, and the transforming optical system is comprised of the collimator 72, line diffuser 91, lens 92 and return mirror 16. The transforming optical system of this LCD backlight 90 has no moveable optical components, but has all stationary optical components.

In the present embodiment, just like the LCD backlights 80 and 85, the multi-light source 71 is used, and it is not necessary to multiplex the laser light in the rear face side of the light guiding plate 17, so the surface normal line directions of the transmission surface or reflection surface of the multi-laser light 73 for both the line diffuser 91 and lens 92, which are added in this LCD backlight 90, can turn to the horizontal direction. As a result, the deposit of dust is prevented, and a highly reliable LCD backlight, free from uneven brightness between the left and right of the screen, and drop in light quantity due to the deposit of dust, can be constructed.

In the above description of the LCD backlights 80, 85 and 90 of the present embodiment, the laser light source unit is the multi-light source 71, but a same effect can be implemented even if the light source 12 of the LCD backlight 10 of Embodiment 1, or the laser light source unit that guides the laser light 11 from the outside using a fiber, like the case of the LCD backlight 40 of Embodiment 2, is used.

In the transforming optical system of the LCD backlights 80 and 85 of the present embodiment, the normal line of a reflection surface of the rotary polygon mirror 14 comes above the horizontal direction, as mentioned above in Embodiment 1, but even if dust is temporarily deposited on this surface, dust drifts away by the rotation of the rotary polygon mirror 14, and causes no problems.

Embodiment 5

Figure 17:
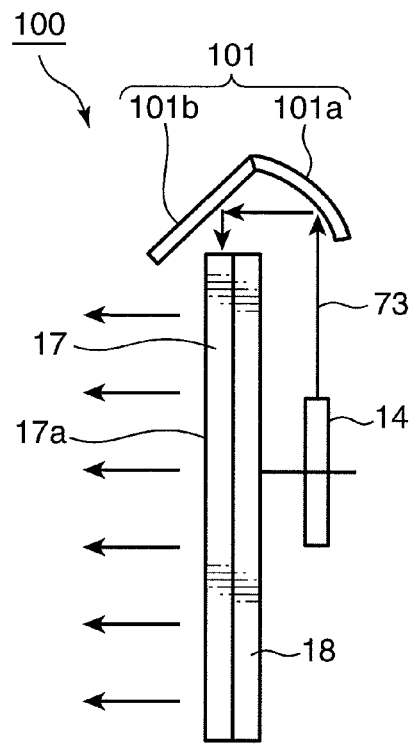
FIG. 17 is a side view depicting a general configuration of an LCD backlight according to Embodiment 5 of the present invention.
Figure 18:
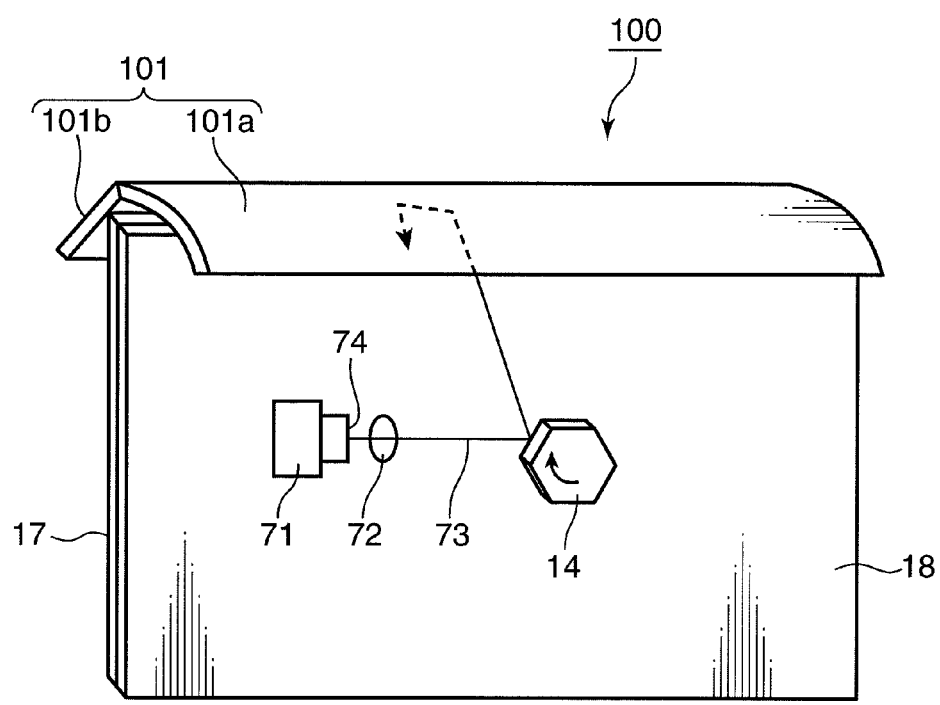
FIG. 18 is a perspective view depicting a general configuration of an LCD backlight according to Embodiment 5 of the present invention.

FIG. 17 and FIG. 18 are a side view and a perspective view depicting a general configuration of an LCD backlight 100 according to Embodiment 5 of the present invention. The difference of this LCD backlight 100 from other embodiments is allowing multi-laser light 73 to enter the light guiding plate 17, not from the side face, but from the top face of the light guiding plate 17. A return mirror 101, which returns the laser light before entering the light guiding plate 17, is constituted by a cylinder mirror 101a and a plane mirror 101b, and the scanning lens used for other LCD backlights is not used.

The operation of this LCD backlight 100 will be described. The multi-laser light 73 emitted from the multi-light source 71 is transformed into parallel light by the collimator 72, enters the rotary polygon mirror 14, is deflected upward, and scanned from the left to right in FIG. 18. Then the multi-laser light 73 is reflected by the cylinder mirror 101a, is reflected by the plane mirror 101b while being condensed in the thickness direction of the light guiding plate 17, and enters the light guiding plate 17 from the top face of the light guiding plate 17. The portion from entering to emission in the light guiding plate 17 is the same as other LCD backlights.

In this LCD backlight 100, the emission end face 74 of the multi-light source 71 corresponds to an example of the light emission surface of the laser light source unit, and the collimator 72, rotary polygon mirror 14 and return mirror 101 correspond to the transforming optical system. In the LCD backlight 100, condensing the laser light in the thickness direction of the light guiding plate 17 is performed by the cylinder mirror 101a, and the normal line direction of the reflection surface of the cylinder mirror 101a is inclined downward from the horizontal direction, and the deposit of dust is therefore of no concern. The normal line direction of the top face of the light guiding plate 17 is vertically upward, but the return mirror 101 can be disposed immediately above the light guiding plate 17, so the return mirror 101 becomes an umbrella against dust, and can prevent the deposit of dust.

The multi-light source 71 is also used for the other stationary optical components of the transforming optical system, so multiplexing the laser light in the rear face side of the light guiding plate 17 is unnecessary. As a result, the surface normal line direction of the transmission surface or reflection surface of the multi-laser light 73 can be all turned to a direction downward from the horizontal direction, so there is no concern with the deposit of dust, and a highly reliable LCD backlight free from a drop in light quantity due to the deposit of dust can be constructed. The condensing function in the thickness direction is included in the return mirror 101, so the number of components can be decreased, and the LCD backlight can be constructed with low cost.

In this LCD backlight 100, the cylinder mirror 101a is disposed on the first stage of the return mirror 101, but the cylinder mirror 101a may be disposed in the position of the plane mirror 101b in a latter stage, or both mirrors may be cylinder mirrors. In the LCD backlights 10, 40, 70, 80, 85 and 90 as well, either one of the return mirror 16a in the first stage and the return mirror 16b in the latter stage or both mirrors may be a cylinder mirrors, omitting the scanning lens 15 and lens 92.

Figure 19:
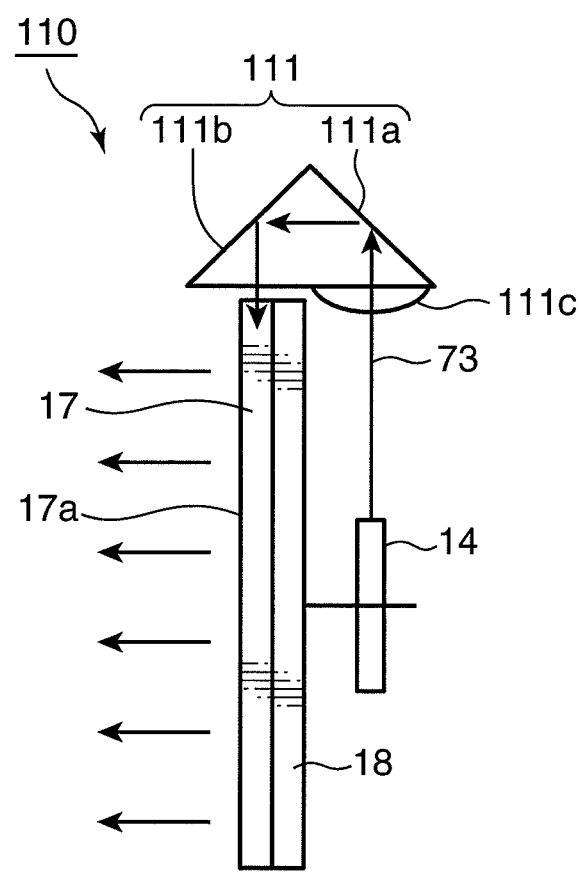
FIG. 19 is a diagram depicting a general configuration of another LCD backlight according to Embodiment 5 of the present invention.

FIG. 19 is a side view depicting a general configuration of another LCD backlight 110 according to Embodiment 5 of the present invention. This LCD backlight 110 has a configuration to allow the multi-laser light 73 to enter from the top face side of the light guiding plate 17, just like the LCD backlight 100, and the configuration is the same as the LCD backlight 100 except that a return prism 111 is used instead of the return mirror 101. The return prism 111 is constituted by a reflection surface 111a in the first stage, a reflection surface 111b in the latter stage and a cylinder unit 111c, which are all integrated.

The multi-laser light 73, deflected and reflected by the rotary polygon mirror 14, enters the cylinder unit 111c, and is totally reflected by the reflection surface 111a in the first stage and the reflection surface 111b in the latter stage of the return prism 111 while being condensed in the thickness direction of the light guiding plate 17, is emitted from the return prism 111, and enters the top face of the light guiding plate 17.

In this LCD backlight 110, the transforming optical system is comprised of a collimator 72, which is not illustrated, rotary polygon mirror 14 and return prism 111. In this LCD backlight 110 as well, the multi-light source 71 is used for the light source, and multiplexing the laser lights in the rear face side of the light guiding plate 17 is unnecessary, so the surface normal line directions of the transmission surface or the reflection surface of the multi-laser light 73 can all be turned to the horizontal direction or a direction downward from the horizontal direction. The normal line direction of the transmission surface of the cylinder unit 111c also turns to a direction downward from the horizontal direction, and the normal line directions of the reflection surface 111a in the first stage and reflection surface 111b in the latter stage also turn to directions downward from the horizontal direction. Dust is deposited on the top side of the return prism 111, but does not affect the total reflection inside the return prism 111, so such a problem as a drop in transmittance does not occur, and the normal line direction of the top face of the light guiding plate 17 is vertically upward, but the return prism 111 can be disposed immediately above, therefore the return prism 111 plays a role of an umbrella against dust, and prevents the deposit of dust. As a result, a highly reliable LCD backlight free from a drop in transmittance due to the deposit of dust can be constructed.

In this LCD backlight 110, condensing the laser light in the thickness direction of the light guiding plate 17 is performed by the cylinder unit 111c, and the condensing function in the thickness direction is included in the return prism 111, so the number of components can be decreased, and the LCD backlight can be constructed with low cost.

In the above description of the LCD backlights 100 and 110 according to the present embodiment, the multi-light source 71 is used for the laser light source unit, but a same effect can be implemented even if the light source 12 of the LCD backlight 10 of Embodiment 1, or the laser light source unit that guides the laser light 11 from the outside using a fiber, like the case of the LCD backlight 40 of Embodiment 2, is used.

In the transforming optical system of the LCD backlights 100 and 110 of the present embodiment, the normal line of a reflection surface of the rotary polygon mirror 14 comes above the horizontal direction, as mentioned above in Embodiment 1, but even if dust is temporarily deposited on this surface, dust drifts away by the rotation of the rotary polygon mirror 14, and causes no problems.

Embodiment 6

Figure 20:
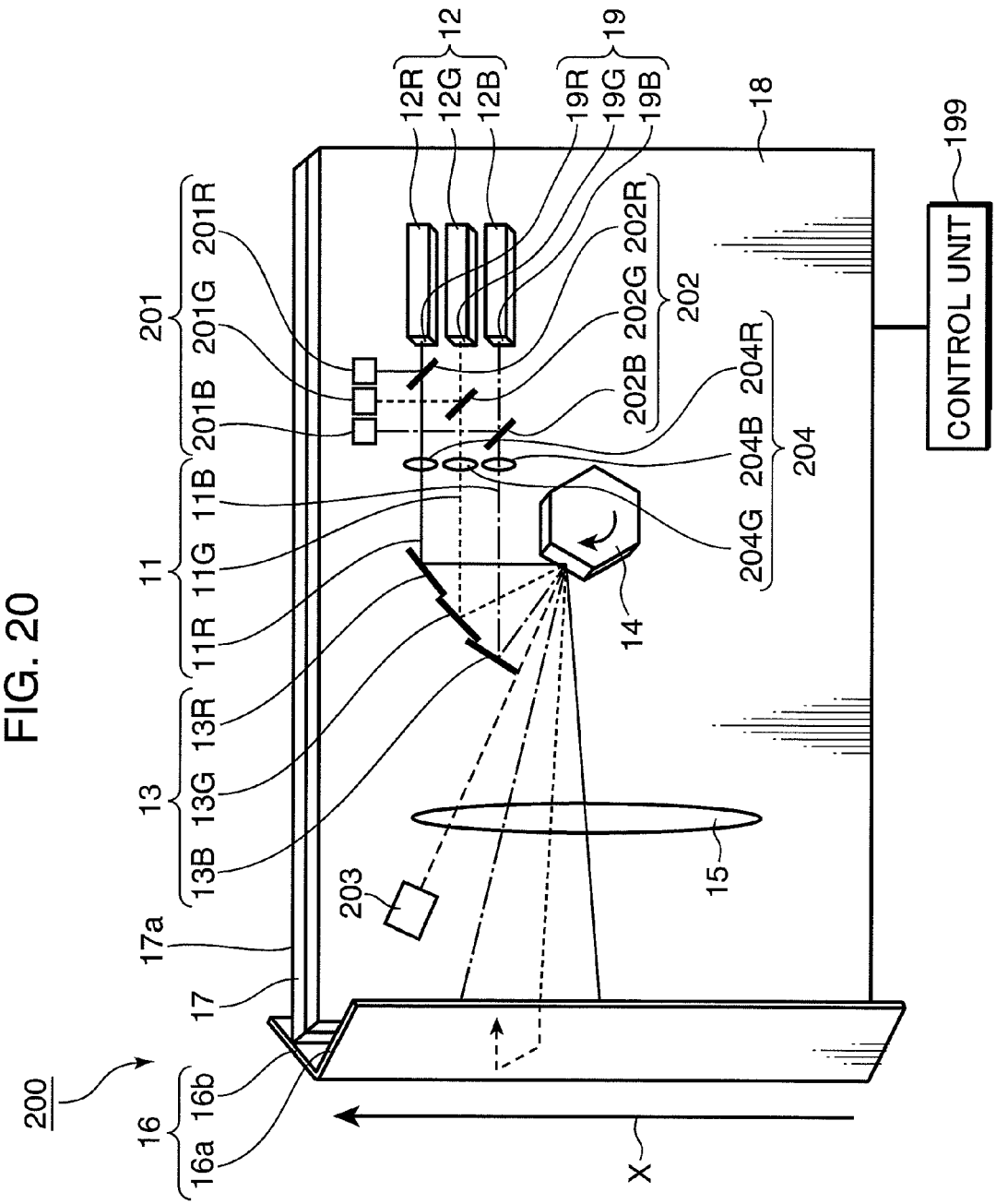
FIG. 20 is a diagram depicting a general configuration of an LCD backlight according to Embodiment 6 of the present invention.

FIG. 20 is a diagram depicting a general configuration of an LCD backlight 200 according to Embodiment 6. This LCD backlight 200 has a configuration similar to the LCD backlight 10 of Embodiment 1, but a difference is that three glass plates 202 (red laser light glass plate 202R, green laser light glass plate 202G and blue laser light glass plate 202B) are disposed, and a photosensor 201 monitors the output of each laser light 11 immediately after the emission from each light source 12 by guiding a part of each laser light 11 (red laser light 11R, green laser light 11G and blue laser light 11B) to each photosensor 201 (red laser light photosensor 201R, green laser light photosensor 201G and blue laser light photosensor 201B), and a photosensor 203, disposed at the downstream side, also monitors the output of each laser light. Here the photosensors 201 and 203 correspond to an example of the measurement unit.

In concrete terms, the control unit 199, which is comprised of control circuit and a drive circuit, is electrically connected to the light source 12 and photosensors 201 and 203 via wires, which are not illustrated, and the photosensors 201 and 203 measure the light quantity of each laser light 11, and the control unit 199 controls each light source 12 so that the intensity of each laser light 11 becomes constant based on the measured light quantity. Most of each laser light 11 emitted from the light source 12 (red light source 12R, green light source 12G and blue light source 12B) transmits through each glass plate 202, and enters the mirror 13 while being condensed by a plurality of lenses 204 (red laser light lens 204R, green laser light lens 204G and blue laser light lens 204B), and a detailed description of the subsequent operation, which is the same as Embodiment 1, is omitted.

Here the photosensors 201 and 203 are disposed as shown in FIG. 20, but the positions are not limited to the example in FIG. 20, only if they are disposed at the upstream side and downstream side of the transforming optical system. By using this configuration, fluctuation of transmittance on the optical path between the photosensor 201 and photosensor 203 can be measured in real-time.

As described in Embodiment 1, in the LCD backlight 200, the laser lights are not multiplexed in the rear face side of the light guiding plate 17, therefore the surface normal line directions of the light transmission surface and light reflection surface of stationary optical components constituting the transforming optical system can be the horizontal direction or can be inclined downward from the horizontal direction, therefore the deposit of dust can be prevented.

On the other hand, if the intensity of the laser light is high, at watt level, or if a short wavelength laser light, such as blue, is used, static electricity that generates around the optical path on the surface of glass material becomes conspicuous due to the piezoelectric effect of the glass material absorbing the laser light, and as a result, floaters, such as dust, are attracted and adhere to the surface of the glass material in some cases. For example, if a 450 nm laser light enters acrylic at a light quantity of 1 kW/cm$^2$, transmittance drops several % in 10 hours, in some cases in a general room environment, due to the adhesion of dust.

If the configuration of the LCD backlight 200 according to Embodiment 6 shown in FIG. 20 is used, the fluctuations of transmittance can be confirmed in real-time. In concrete terms, the light quantity of the photosensor 203 immediately before entering the light guiding plate 17 is fed back, whereby the control unit 199 controls each light source 12 so that the same quantity of light always enters the light guiding plate 17. The control unit 199 can also estimate the adhesion of dust on the optical paths of optical components between both sensors by monitoring the changes of light quantity of the photosensor 201.

For the photosensor 201, the laser light 11 is reflected upward by the glass plate 202, but in order to avoid a surface facing up, the photosensor 201 may be disposed horizontally so that the laser light 11 is reflected by the glass plate 202 in the horizontal direction, and the photosensor 201 receives this laser light 11 reflected in the horizontal direction. In this case, the glass plate 202 can be disposed such that the surface normal line directions of the transmission surface and reflection surface of the glass plate 202 are the horizontal direction or are inclined downward from the horizontal direction, therefore the deposit of dust floating in the device on the transmission surface or reflection surface of the glass plate 202 can be prevented.

Figure 21:
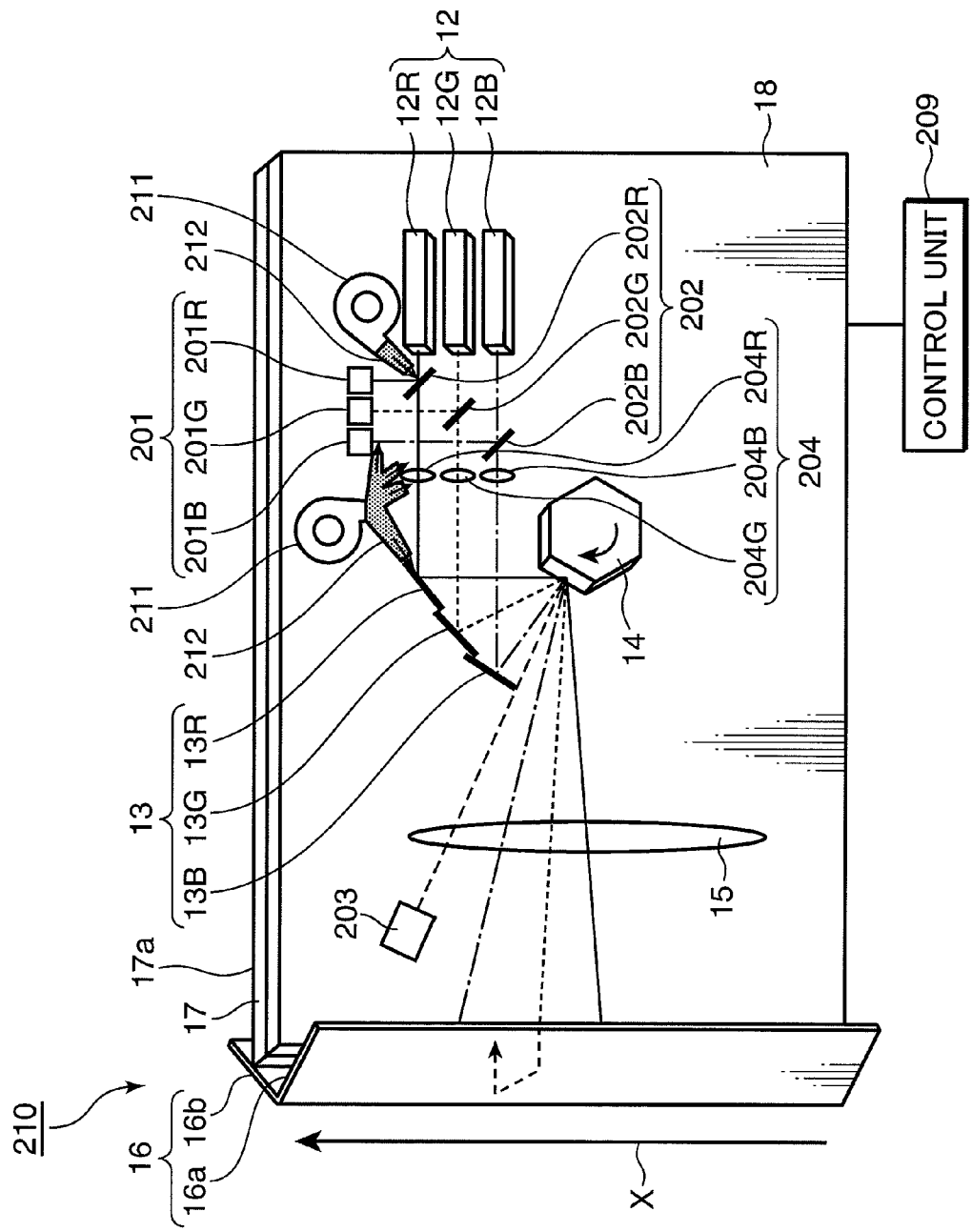
FIG. 21 is a diagram depicting a general configuration of another LCD backlight according to Embodiment 6 of the present invention.

FIG. 21 is a diagram depicting a general configuration of another LCD backlight 210 according to Embodiment 6. The LCD backlight 210 has a configuration similar to the LCD backlight 200, but a difference is that a plurality of fans 211 are added. In concrete terms, the control unit 209, which is comprised of a control circuit and a drive circuit, is electrically connected to the light source 12, photosensors 201 and 203 and fan 211 via wires, which are not illustrated, and the photosensors 201 and 203 measure the light quantity of each laser light 11, and the control unit 209 controls the capacity of the fan 211 based on the measured light quantity. Here the photosensors 201 and 203 correspond to an example of the measurement unit, and the fan 211 corresponds to an example of the fan unit.

Air emitted from the fan 211 is guided by a plurality of ducts 212, and is efficiently guided to the surface of each optical component (e.g. red laser light reflection mirror 13R, green laser light reflection mirror 13G, blue laser light reflection mirror 13B, red laser light photosensor 201R, green laser light photosensor 201G, blue laser light photosensor 201B, red laser light glass plate 202R, green laser light glass plate 202G, blue laser light glass plate 202B, red laser light lens 204R, green laser light lens 204G and blue laser light lens 204B). By blowing away the dust attracted by static electricity generated on the surface of each optical component, the adhesion of dust can be prevented, and a drop in transmittance due to the adhesion of dust can be prevented.

The capacity of the fan 211 is determined by the light quantity measured by the photosensors 201 and 203, and the control unit 209 increases the capacity of the fan 211 if the light quantity measured by the photosensors 201 and 203 decreases to be less than a predetermined value, and decreases the capacity of the fan 211 or stops the fan 211 if the light quantity measured by the photosensors 201 and 203 increases to be a predetermined value or more.

By this, the rotation frequency of the fan 211 can be decreased if the transmittance of the optical components in the device does not drop, like a case of being installed in a place with little dust, so power consumption can be decreased. If air from the fan 211 is blown downward, a redeposit of dust contained in air can be prevented.

Here the operation of the fan 211 is determined based on the values detected by the photosensors 201 and 203, however the fan 211 may be operated periodically, or may be operated based on predetermined conditions, such as turning the LCD backlight OFF. In this case, the photosensors 201 and 203 need not be operated constantly, but can be operated only when this condition is met.

Figure 22:
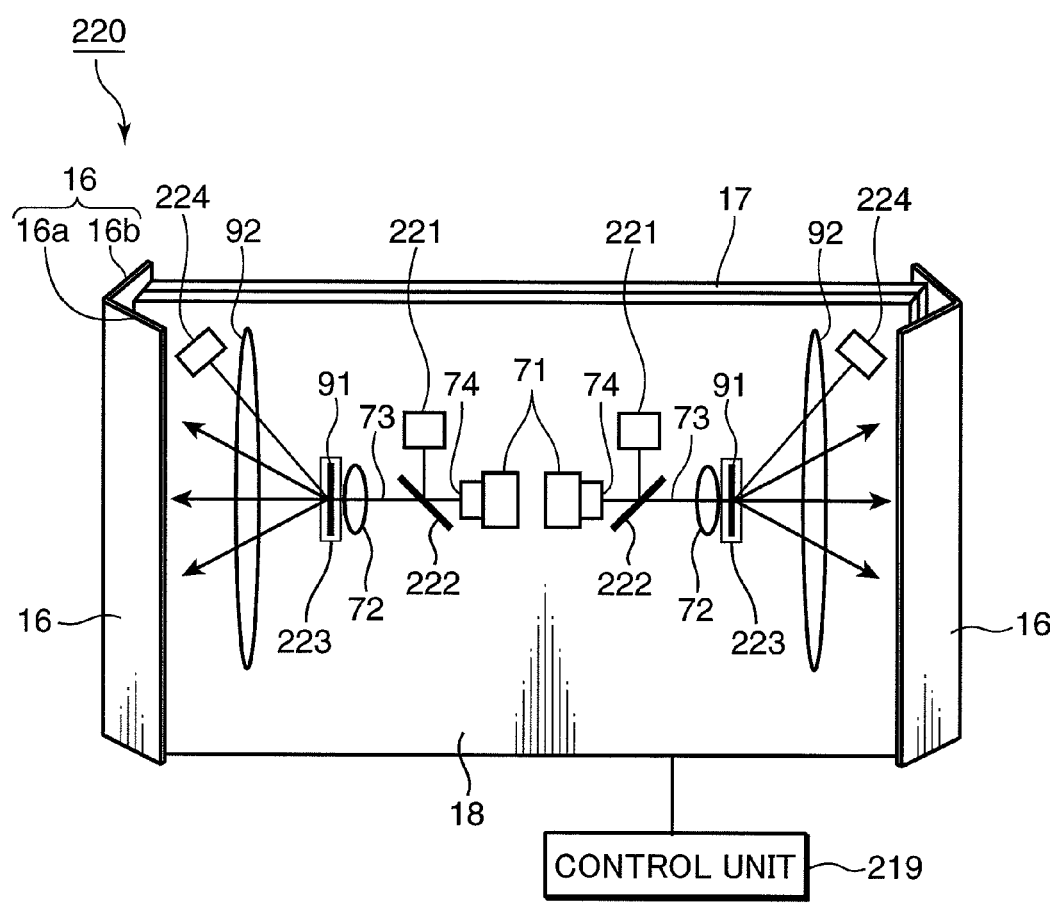
FIG. 22 is a diagram depicting a general configuration of another LCD backlight according to Embodiment 6 of the present invention.

FIG. 22 is a diagram depicting a general configuration of another LCD backlight 220 according to Embodiment 6. The LCD backlight 220 has a configuration similar to the LCD backlight 90 according to Embodiment 4, and similar to the LCD backlight 200 in terms of measuring the laser light quantity at two locations, that is, an area immediately after the emission of a light source, and an area downstream, using a plurality of photosensors 221 and 224, but a difference is that the disposed line diffuser 91 can move onto the actuator 223.

In concrete terms, two laser light source units and transforming optical systems, from the multi-light source 71 to the return mirror 16, are used, and these two laser light source units and transforming optical systems are disposed at the left and right of the optical board 18, the glass plate 222 is disposed on each optical path, a part of the multi-laser light 73 is guided to the photosensor 221, and most of the multi-laser light 73 is guided to the collimator 72 via each glass plate 222. The control unit 219 is comprised of a control circuit and drive circuit, and is electrically connected to the multi-laser light 73, photosensors 221 and 224, and actuator 223 via wires which are not illustrated, the photosensors 221 and 224 measure the light quantity of each laser light 11, and the control unit 219 controls the operation of the multi-light source 71 and actuator 223 based on the measured light quantity. Here the photosensors 221 and 224 correspond to an example of the measurement unit, and the actuator 223 corresponds to an example of the drive unit.

By the above configuration, in the LCD backlight 220, light quantity measured by the photosensor 224, for example, can be fed back to the multi-light source 71, so as to make the light quantity of the laser light that enters the light guiding plate 17 constant, just like the LCD backlights 200 and 210. At this time, the control unit 219 can monitor the fluctuation of the transmittance of the optical components between the photosensor 224 and the photosensor 221 by measuring the light quantity of the photosensor 221.

Therefore if dust adheres to the line diffuser 91 and the light quantity of the photosensor 221 increases, the control unit 219 drives the actuator 223, so that the position of the line diffuser 91 is shifted in a direction perpendicular to the page face (horizontal direction). As a result, the transmittance of the line diffuser 91 can be recovered by using a portion which was not an optical path thus far and that is free from dust adhesion. The line diffuser 91 has a role to expand the laser light in the width direction of the light guiding plate 17, but has no power in the thickness direction, therefore the characteristics as an optical system are unchanged even if it is shifted in a direction perpendicular to the page face (horizontal direction).

The optical component of which position is shifted is not limited to a line diffuser, but may be another optical component. If another lens (e.g. collimator 72) is an axisymmetric aspherical lens, this lens is constituted by two cylindrical lenses, then a drop in transmittance due to the adhesion of dust can be avoided by shifting this lens, just like the case of the line diffuser 91, while maintaining the same optical characteristics.

The actuator 223 may be operated in a stage where the adhesion of dust is not detected based on the output of the photosensors 221 and 224. By always operating the actuator 223 at high-speed, the density of laser light that is irradiated per unit area can be decreased, and the adhesion of dust can be decreased, and the air generated by the operation also decreases the adhesion of dust.

Here the operation of the actuator 223 is determined based on the values detected by the photosensors 221 and 224, but the actuator 223 may be operated periodically or may be operated based on predetermined conditions, such as turning the LCD backlight 220 OFF. In this case, the photosensors 221 and 224 need not be operated constantly, but can be operated only when a condition is met.

Embodiment 7

Figure 23:
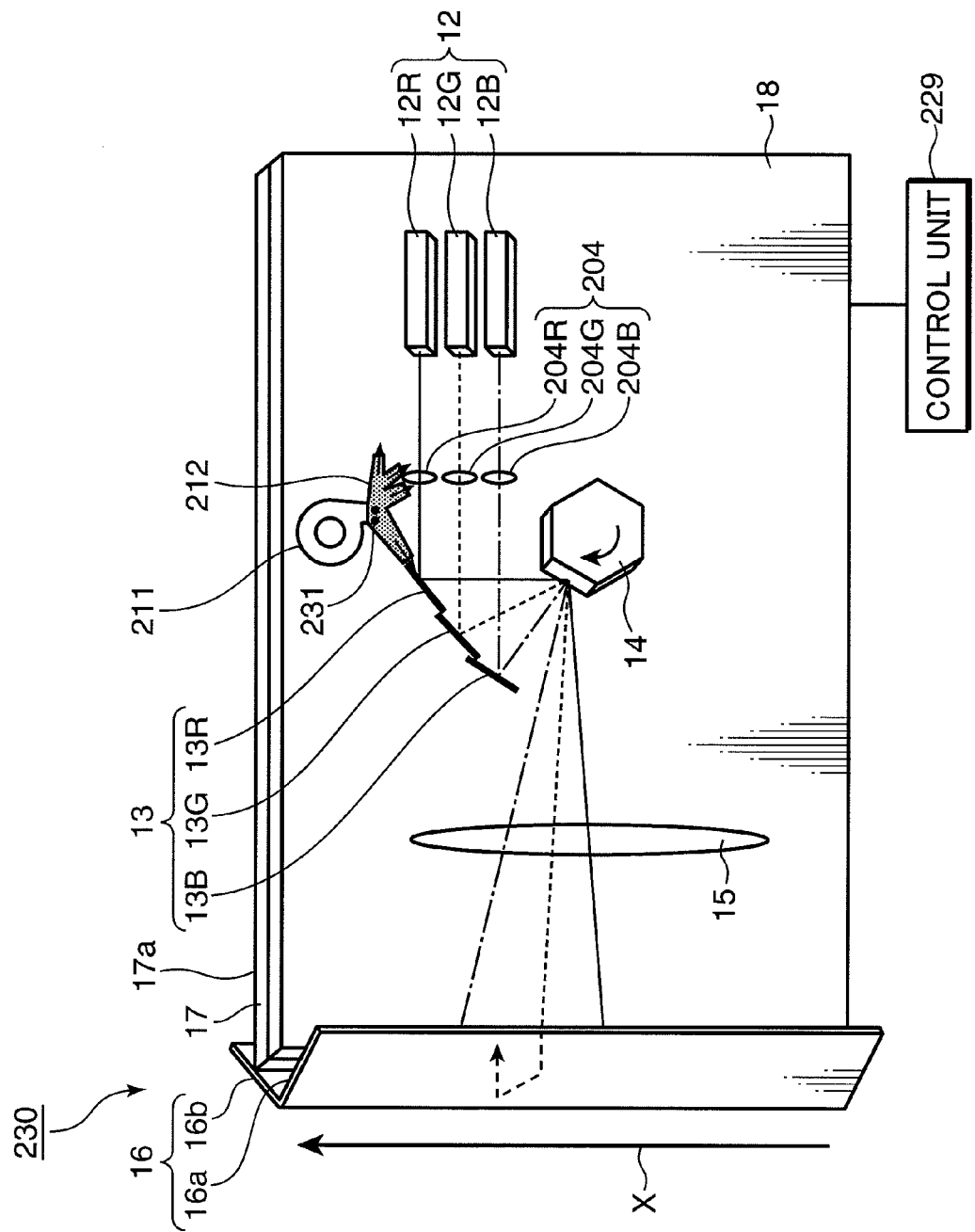
FIG. 23 is a diagram depicting a general configuration of an LCD backlight according to Embodiment 7 of the present invention.

FIG. 23 is a diagram depicting a general configuration of an LCD backlight 230 according to Embodiment 7. This LCD backlight 230 is similar to the LCD backlight 10 of Embodiment 1, but a difference is that a corona discharge element 231 is included. In concrete terms, the control unit 229 is comprised of a control circuit and drive circuit, and is electrically connected to the light source 12, fan 211 and corona discharge element 231 via wires, which are not illustrated, so as to control the operation of the fan 211 and the corona element 231.

When voltage is applied to the corona discharge element, air in the discharged area is ionized, and the charged substances existing beyond this area can be electrically neutralized by blowing the generated ions by the fan. In this LCD backlight 230 as well, static electricity generated on the surface of each optical component (e.g. red laser light reflection mirror 13R, green laser light reflection mirror 13G, blue laser light reflection mirror 13B, red laser light lens 204R, green laser light lens 204G, blue laser light lens 204B) can be removed by blowing the ions generated in the corona discharge element 231 along the duct 212 using the fan 211. If air from the fan 211 is blown downward, a redeposit of dust contained in the air can be prevented.

Figure 24:
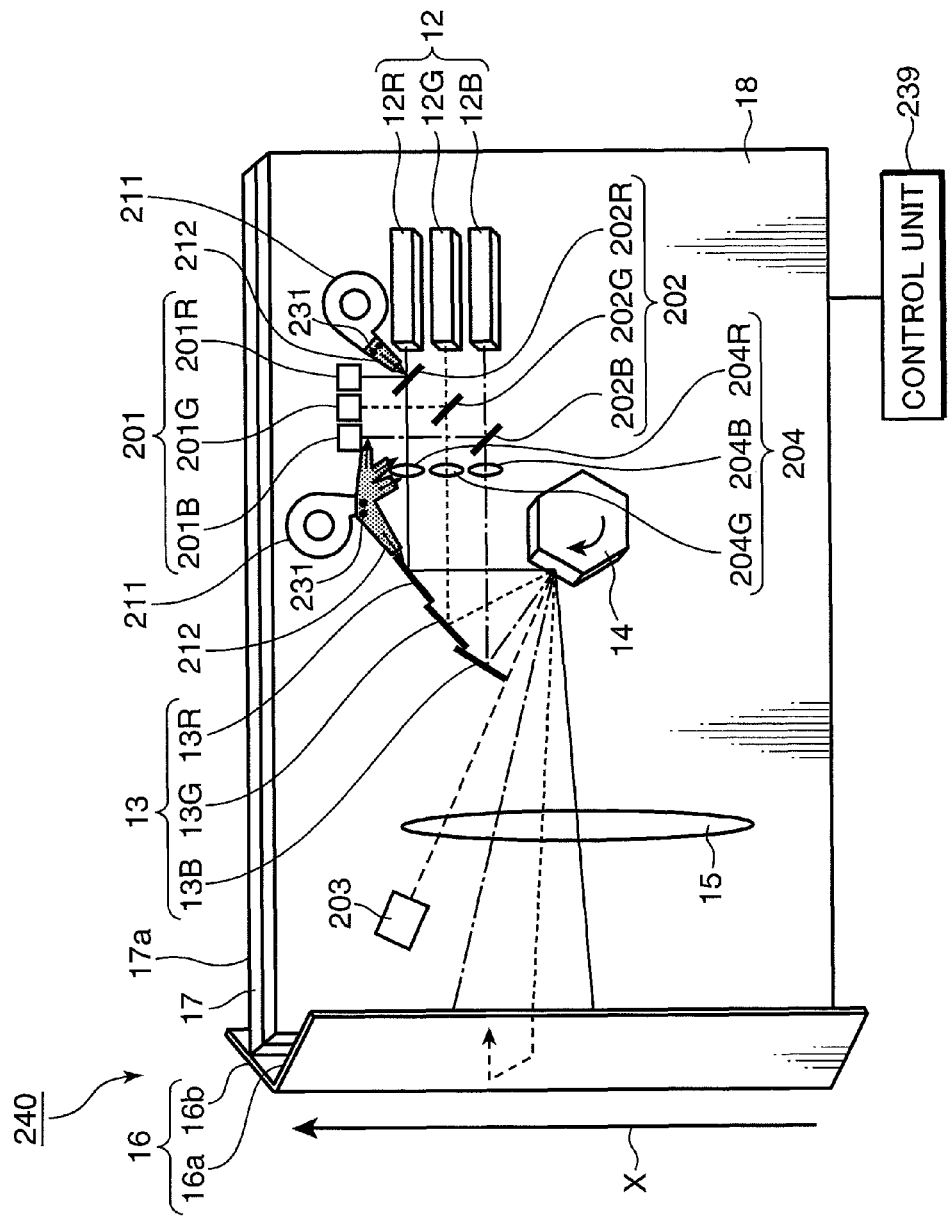
FIG. 24 is a diagram depicting a general configuration of another LCD backlight according to Embodiment 7 of the present invention.

FIG. 24 is a diagram depicting a general configuration of another LCD backlight 230 according to Embodiment 7. The LCD backlight 240 shown in FIG. 24 has the corona discharge element 231, just like the LCD backlight 230, but a difference is that the photosensors 201 and 203 are equipped, just like the LCD backlight 210. In concrete terms, the control unit 239 is comprised of a control circuit and drive circuit, and is electrically connected to the light source 12, photosensors 201 and 203, fan 211 and corona discharge element 231 via wires, which are not illustrated, and the photosensors 201 and 203 measure the light quantity of each laser light 11, and the control unit 239 controls the operation of the light source 12, fan 211 and corona discharge element 231 based on the measured light quantity. Here the photosensors 201 and 203 correspond to an example of the measurement unit.

By this configuration, the amount of ions generated in the corona discharge element 231 can be determined based on the light quantity measured by the photosensors 201 and 203, and the adhesion of dust is prevented by generating small amount of ions when a drop in transmittance of the optical components is not detected, for example, and the amount of ions to be generated is increased if a drop in transmittance of the optical system is detected, so as to remove the adherence of dust with certainty, and to completely blow the air using the fan 211.

The above mentioned configurations according to each embodiment are examples, and needless to say, they can be modified in various ways within a range that does not deviate from the spirit of the invention. The entire LCD backlight may be covered so that the entry of dust can be suppressed, and the influence of dust can be minimized.

Based on the above embodiments, the present invention can be summarized as follows. The liquid crystal display backlight according to the present invention has: a laser light source unit that emits laser light; a transforming optical system that transforms a laser light from the laser light source unit into a linear light; and a light guiding plate that allows the linear light to enter and emits a two-dimensional light in the horizontal direction. A light emission surface of the laser light source unit is disposed in a rear face side of the light guiding plate so that a surface normal line thereof is in the horizontal direction, or is inclined downward from the horizontal direction, the transforming optical system includes a stationary optical component that does not have a movable portion, and the stationary optical component is disposed in the rear face side of the light guiding plate so that surface normal lines of a light transmission surface and a light reflection surface thereof are all in the horizontal direction or are inclined downward from the horizontal direction.

According to this liquid crystal display backlight, the light emitting surface of the laser light source unit is disposed in the rear face side of the light guiding plate so that the surface normal line thereof is in the horizontal direction or is inclined downward from the horizontal direction, and the stationary optical component that does not have a movable portion is disposed in the rear face side of the light guiding plate so that the surface normal lines of the light transmission surface and the light reflection surface thereof are all in the horizontal direction or are inclined downward from the horizontal direction, therefore a highly reliable liquid crystal display backlight free from a drop in brightness and uneven brightness due to the deposit of dust on the light emission surface of the laser light source unit and stationary optical component, while maintaining a thin construction, can be implemented, and a liquid crystal display having wide color reproduction range using this backlight can be implemented with low cost.

In other words, in the liquid crystal display backlight and liquid crystal display device having the light guiding mirror that emits a laser light in the horizontal direction to illuminate a predetermined vertical surface, the light emission surface of the laser light source is disposed in the rear face side of the light guiding plate so that the surface normal line thereof is in the horizontal direction or is inclined downward from the horizontal direction, and the stationary optical component constituting the transforming optical system for transforming the laser light from the laser light source into a linear light is disposed in the rear face side of the light guiding plate so that surface normal lines of the light transmission surface and light reflection surface thereof are all in the horizontal direction or are inclined downward from the horizontal direction, therefore a drop in brightness and uneven brightness due to a deposit of dust can be easily prevented with low cost, and an effective dust countermeasure can also be provided for the deposit of dust due to static electricity.

It is preferable that the laser light source unit has a plurality of laser light sources, the plurality of laser light sources are disposed in the rear face side of the light guiding plate, and principal rays of a plurality of laser lights emitted from the plurality of laser light sources do not overlap with one another in all areas of the transforming optical system.

In this case, the stationary optical components can be easily disposed so that the surface normal lines of the light transmission surface and light reflection surface can all be in the horizontal direction or can be inclined downward from the horizontal direction.

It is preferable that the laser light source unit has a plurality of laser light sources and one optical fiber, and a plurality of laser lights emitted from the plurality of laser light sources are multiplexed in a location other than the rear face of the light guiding plate and enter the optical fiber, and then enter the transforming optical system through the optical fiber.

In this case, so that the stationary optical components can be easily disposed, the surface normal lines of the light transmission source and light reflection surface can all be in the horizontal direction or can be inclined downward from the horizontal direction, and the plurality of laser light sources can be disposed at positions distant from the light guiding plate, therefore the transfer of heat, generated from the plurality of laser light sources, to the side of the main body of the device, such as to the light guiding plate, can be prevented, and the device itself can be constructed thinner.

It is preferable that the laser light source unit is a single light source where a plurality of laser light sources are housed in one enclosure, and the single light source is disposed in the rear face side of the light guiding plate.

In this case, the stationary optical component can be easily disposed so that the surface normal lines of the light transmission surface and light reflection surface of so can all be in the horizontal direction or can be inclined downward from the horizontal direction.

It is preferable that transforming optical system further has a reflection element that deflects the laser light from the stationary optical component before entering to the light guiding plate, and allows the laser light to enter from the side face of the light guiding plate, and the reflection element is disposed in a side face side of the light guiding plate so that the surface normal lines of the light reflection surfaces thereof are all in the horizontal direction or are inclined downward from the horizontal direction.

In this case, the reflection element is also disposed on the side face side of the light guiding plate so that the surface of normal lines of the light reflection surface are all in the horizontal direction or are inclined downward from the horizontal direction, therefore a deposit of dust on the entire transforming optical system can be suppressed, and a highly reliable liquid crystal display backlight free from a drop in brightness and uneven brightness can be implemented.

It is preferable that the light guiding plate allows the laser light to enter from both side faces thereof. In this case, a liquid crystal display backlight having high image quality, which excels in evenness of brightness in the left and right directions of the light guiding plate, can be provided.

The transforming optical system may further have a reflection element that deflects the laser light from the stationary optical component before entering the light guiding plate, and allows the laser light to enter from the top face of the light guiding plate, and the reflection element may condense the laser light in the thickness direction of the light guiding plate.

In this case, the reflection element becomes an umbrella against dust, and suppresses the deposit of dust on the top face of the light guiding plate, so a highly reliable liquid crystal display backlight free from a drop in brightness and uneven brightness can be implemented, and at the same time, the reflection element has a condensing function in the thickness direction, so the number of components decreases and the device can be created with low cost.

It is preferable that the liquid crystal display backlight further has a measurement unit that measures the light quantity of the laser light at two or more locations for one laser light source constituting the laser light source unit in the transforming optical system.

In this case, the fluctuation of transmittance of each optical component of the transforming optical system can be measured based on the measured light quantity.

It is preferable that the liquid crystal display backlight further has: a fan unit which directly blows air to at least one optical component out of a plurality of optical components constituting the transforming optical system; and a control unit that controls a capacity of the fan unit according to the light quantity measured by the measurement unit.

In this case, the dust that is attracted by the static electricity generated on the surface of each optical component of the transforming optical system can be blown away according to the measured light quantity, so the adhesion of dust can be prevented, and a drop in transmittance of each optical component of the transforming optical system due to the adhesion of dust can be prevented.

In the liquid crystal display backlight, it is preferable that the transforming optical system further has: a drive unit that moves the position of at least one of the stationary optical components; and a control unit that controls the operation amount of the drive unit according to the light quantity measured by the measurement unit is further provided.

In this case, the position of the stationary optical component can be shifted by controlling the operation amount of the drive unit according to the measured light quantity, so the portion with no adhesion of dust, which was not on the optical path thus far, can be used, and the transmittance of the stationary optical component can be recovered.

It is preferable that the liquid crystal display backlight further has: a cornea discharge element that is disposed near the transforming optical system; and a control unit that controls the operation of the corona discharge element according to the light quantity measured by the measurement unit.

In this case, the static electricity generated on the surface of each optical component of the transforming optical system can be removed according to the measured light quantity, therefore the adhesion of dust due to static electricity can be prevented, and a highly reliable liquid crystal display backlight of which drop in brightness is suppressed can be implemented.

It is preferable that the light guiding plate includes diffusion particles for diffusing light inside thereof.

In this case, the laser light that entered the light guiding plate is emitted from the light guiding plate while being diffused in a wide range in the light guiding plate by the diffusion particles, so a liquid crystal display backlight with high image quality that excels in evenness of brightness can be implemented.

It is preferable that a beam diameter of the linear light in the thickness direction of the light guiding plate is 90% or more of the thickness of the light guiding plate in at least one location on an entering surface of the light guiding plate to which the linear light enters.

In this case, the beam diameter in the thickness direction can be increased with respect to the thickness of the light guiding plate, therefore even if dust adheres to the entrance surface of the laser light of the light guiding plate, the ratio of the quality of light blocked by the adhering dust, out of the laser lights illuminating the entrance surface of the light guiding plate, can be decreased, so the uneven brightness of the two-dimensional light that is emitted from the light guiding plate can be further suppressed.

It is preferable that the laser light source unit includes a red laser light source, a green laser light source and a blue laser light source.

In this case, a liquid crystal display that has a wide color reproduction range can be implemented with low cost.

It is preferable that the laser light source unit includes a semiconductor laser light source, and the semiconductor laser light source includes a package having a cover glass, and a micro-lens array is formed on the cover glass.

In this case, the intensity distribution of the laser light can be uniform by the laser light passing through the micro-lens array.

It is preferable that the micro-lens array is formed inside the cover glass.

In this case, the intensity distribution of the laser light outside the cover glass that contacts the outside air, that contains dust, can be flatter than the Gaussian distribution, so the adhesion of dust due to static electricity can be suppressed, and a highly reliable liquid crystal display backlight, of which drop in brightness is suppressed, can be implemented.

Another liquid crystal display backlight according to the present invention has: a laser light source unit that emits laser light; a transforming optical system that transforms a laser light from the laser light source unit into a linear light; and a light guiding plate that allows the linear light to enter and emits two-dimensional light in the horizontal direction. The transforming optical system includes a stationary optical component that does not have a movable portion, the stationary optical component is disposed in a rear face side of the light guiding plate, and a corona discharge element that is disposed near the stationary optical component is further provided.

In this liquid crystal display backlight, charged substances are electrically neutralized by ions generated from the corona discharge element, and the static electricity generated on the surface of the stationary optical component can be removed, so the adhesion of dust due to static electricity can be prevented, and a highly reliable liquid crystal display backlight, of which drop in brightness is suppressed, can be implemented.

Another liquid crystal display backlight according to the present invention has: a laser light source unit that emits laser light; a transforming optical system that transforms a laser light from the laser light source unit into a linear light; and a light guiding plate that allows the linear light to enter and emits a two-dimensional light in the horizontal direction. A beam diameter of the linear light in the thickness direction of the light guiding plate is 90% or more of the thickness of the light guiding plate in at least one location on an entering surface of the light guiding plate to which the linear light enters.

According to this liquid crystal display backlight, the beam diameter in the thickness direction can be increased with respect to the thickness of the light guiding plate, therefore even if dust that adheres to the entrance surface of the laser light of the light guiding plate increases, the ratio of the quantity of light blocked by the adhering dust, out of the laser lights illuminating the entrance surface of the light guiding plate, can be decreased, so the uneven brightness of the two-dimensional light that is emitted from the light guiding plate can be further suppressed.

A liquid crystal display device according to the present invention has: a liquid crystal display panel; and a backlight illumination device that illuminates the liquid crystal display panel from the rear face side. The backlight illumination device is one of the above mentioned liquid crystal display backlight.

According to the present liquid crystal display device, the highly reliable liquid crystal display backlight free from a drop in brightness and uneven brightness due to the deposit of dust on the stationary optical component is used, while maintaining the thin construction of the device, so a thin and highly reliable liquid crystal display, with a wide color reproduction range, can be implemented with low cost.

The LCD backlight of the present invention has good characteristics free from a drop in brightness and generation of uneven brightness due to the deposit of dust on the optical components, so it is useful since a highly reliable and thin LCD backlight, with improved dust resistance, can be implemented using a low cost optical configuration. Moreover, the LCD backlight of the present invention is useful in that, if it is used, a thin and highly reliable liquid crystal display device, that excels in color reproducibility and has improved dust resistance, can be implemented with low cost.

The invention claimed is:

1. A liquid crystal display backlight, comprising:
a laser light source unit that emits laser light;
a transforming optical system that transforms a laser light from the laser light source unit into a linear light; and
a light guiding plate that allows the linear light to enter and emits a two-dimensional light from an emission surface in a horizontal direction with respect to a long side of the light guiding plate,
wherein a light emission surface of the laser light source unit is disposed in a rear face side of the light guiding plate with respect to the emission surface so that a surface normal line of the light emission surface is in the horizontal direction, or is inclined downward from the horizontal direction,
the transforming optical system includes a stationary optical component that does not have a movable portion, and
the stationary optical component is disposed in the rear face side of the light guiding plate so that surface normal lines of a light transmission surface and a light reflection surface thereof are all in the horizontal direction or are inclined downward from the horizontal direction.

2. The liquid crystal display backlight according to claim 1, wherein
the laser light source unit comprises a plurality of laser light sources,
the plurality of laser light sources are disposed in the rear face side of the light guiding plate, and
principal rays of a plurality of laser lights emitted from the plurality of laser light sources do not overlap with one another in all areas of the transforming optical system.

3. The liquid crystal display backlight according to claim 1, wherein
the laser light source unit comprises a plurality of laser light sources and one optical fiber, and
a plurality of laser lights emitted from the plurality of laser light sources are multiplexed in a location other than the rear face of the light guiding plate and enter the optical fiber, and then enter the transforming optical system through the optical fiber.

4. The liquid crystal display backlight according to claim 1, wherein
the laser light source unit is a single light source where a plurality of laser light sources are housed in one enclosure, and
the single light source is disposed in the rear face side of the light guiding plate.

5. The liquid crystal display backlight according to claim 1, wherein
the transforming optical system further comprises a reflection element that deflects the laser light from the stationary optical component before entering the light guiding plate, and allows the laser light to enter from the side face of the light guiding plate, and
the reflection element is disposed in a side face side of the light guiding plate so that the surface normal lines of the light reflection surfaces thereof are all in the horizontal direction or are inclined downward from the horizontal direction.

6. The liquid crystal display backlight according to claim 1, wherein
the light guiding plate allows the laser light to enter from both side faces thereof.

7. The liquid crystal display backlight according to claim 1, wherein
the transforming optical system further comprises a reflection element that deflects the laser light from the stationary optical component before entering the light guiding plate, and allows the laser light to enter from the top face of the light guiding plate, and
the reflection element condenses the laser light in a thickness direction of the light guiding plate.

8. The liquid crystal display backlight according to claim 1, further comprising a measurement unit that measures a light quantity of the laser light at two or more locations for one laser light source constituting the laser light source unit in the transforming optical system.

9. The liquid crystal display backlight according to claim 8, further comprising:
a fan unit which directly blows air to at least one optical component out of a plurality of optical components constituting the transforming optical system; and
a control unit that controls a capacity of the fan unit according to the light quantity measured by the measurement unit.

10. The liquid crystal display backlight according to claim 8, wherein
the transforming optical system further comprises a drive unit that moves a position of at least one of the stationary optical components, and
the liquid crystal display backlight further comprises a control unit that controls an operation amount of the drive unit according to the light quantity measured by the measurement unit.

11. The liquid crystal display backlight according to claim 8, further comprising:
a corona discharge element that is disposed near the transforming optical system; and
a control unit that controls the operation of the corona discharge element according to the light quantity measured by the measurement unit.

12. The liquid crystal display backlight according to claim 1, wherein
the light guiding plate includes diffusion particles for diffusing light inside thereof.

13. The liquid crystal display backlight according to claim 1, wherein
a beam diameter of the linear light in a thickness direction of the light guiding plate is 90% or more of the thickness of the light guiding plate in at least one location on an entering surface of the light guiding plate to which the linear light enters.

14. The liquid crystal display backlight according to claim 1, wherein
the laser light source unit includes a red laser light source, green laser light source and blue laser light source.

15. The liquid crystal display backlight according to claim 1, wherein
the laser light source unit includes a semiconductor laser light source,
the semiconductor laser light source includes a package having a cover glass, and
a micro-lens array is formed on the cover glass.

16. The liquid crystal display backlight according to claim 15, wherein
the micro-lens array is formed inside the cover glass.

17. A liquid crystal display backlight, comprising:
a laser light source unit that emits laser light;
a transforming optical system that transforms a laser light from the laser light source unit into a linear light; and
a light guiding plate that allows the linear light to enter and emits two-dimensional light in a horizontal direction with respect to a long side of the light guiding plate,
wherein the transforming optical system includes a stationary optical component that does not have a movable portion,
the stationary optical component is disposed in a rear face side of the light guiding plate, and
a corona discharge element is disposed near the stationary optical component.

18. A liquid crystal display backlight, comprising:
a laser light source unit that emits laser light;
a transforming optical system that transforms a laser light from the laser light source unit into a linear light; and
a light guiding plate that allows the linear light to enter and emits a two-dimensional light in a horizontal direction with respect to a long side of the light guiding plate,
wherein a beam diameter of the linear light in a thickness direction of the light guiding plate is 90% or more of the thickness of the light guiding plate in at least one location on an entering surface of the light guiding plate to which the linear light enters.

19. A liquid crystal display device, comprising:
a liquid crystal display panel; and
a backlight illumination device that illuminates the liquid crystal display panel from the rear face side,
wherein the backlight illumination device is the liquid crystal display backlight according to claim 1.

* * * * *